(12) United States Patent
Koizumi et al.

(10) Patent No.: US 8,120,635 B2
(45) Date of Patent: Feb. 21, 2012

(54) EXPOSURE HEAD AND AN IMAGE FORMING APPARATUS

(75) Inventors: Ryuta Koizumi, Shiojiri (JP); Yujiro Nomura, Shiojiri (JP); Takeshi Sowa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 174 days.

(21) Appl. No.: 12/352,906

(22) Filed: Jan. 13, 2009

(65) Prior Publication Data

US 2009/0185277 A1 Jul. 23, 2009

(30) Foreign Application Priority Data

Jan. 18, 2008 (JP) ................... 2008-008939
Dec. 1, 2008 (JP) ................... 2008-306479

(51) Int. Cl.
*B41J 15/14* (2006.01)
*B41J 27/00* (2006.01)

(52) U.S. Cl. ...................... 347/244; 347/258

(58) Field of Classification Search ............... 347/238, 347/241, 242, 244, 256–258, 229, 234, 148
See application file for complete search history.

(56) References Cited

U.S. PATENT DOCUMENTS

| | | | | |
|---|---|---|---|---|
| 4,435,064 A | * | 3/1984 | Tsukada et al. | 355/1 |
| 4,918,465 A | * | 4/1990 | Morita | 347/232 |
| 5,023,442 A | * | 6/1991 | Taniguchi et al. | 250/208.1 |
| 5,543,830 A | * | 8/1996 | Lea | 347/241 |
| 6,538,682 B2 | * | 3/2003 | Ohkubo | 347/241 |
| 6,583,805 B2 | * | 6/2003 | Mashimo et al. | 347/241 |
| 6,816,181 B2 | * | 11/2004 | Ohkubo | 347/238 |
| 7,463,276 B2 | * | 12/2008 | Forrer et al. | 347/241 |
| 7,468,736 B2 | * | 12/2008 | Tsujino et al. | 347/244 |
| 2006/0001731 A1 | * | 1/2006 | Nakamura et al. | 347/225 |
| 2008/0080057 A1 | * | 4/2008 | Yamamura | 359/622 |

FOREIGN PATENT DOCUMENTS

| | | |
|---|---|---|
| JP | 06-278314 | 10/1994 |
| JP | 2005-276849 | 10/2005 |

* cited by examiner

*Primary Examiner* — Hai C Pham
(74) *Attorney, Agent, or Firm* — DLA Piper LLP (US)

(57) ABSTRACT

An exposure head, includes: a lens array that includes a light transmissive substrate whose length in a first direction is greater than a length thereof in a second direction orthogonal to the first direction, a first lens that is arranged on the light transmissive substrate, and a second lens that is arranged on the light transmissive substrate at the first direction of the first lens, the first lens and the second lens being connected in the first direction; and a head substrate that is provided with a first light emitting element that emits a light toward the first lens and a second light emitting element that emits a light toward the second lens.

2 Claims, 30 Drawing Sheets

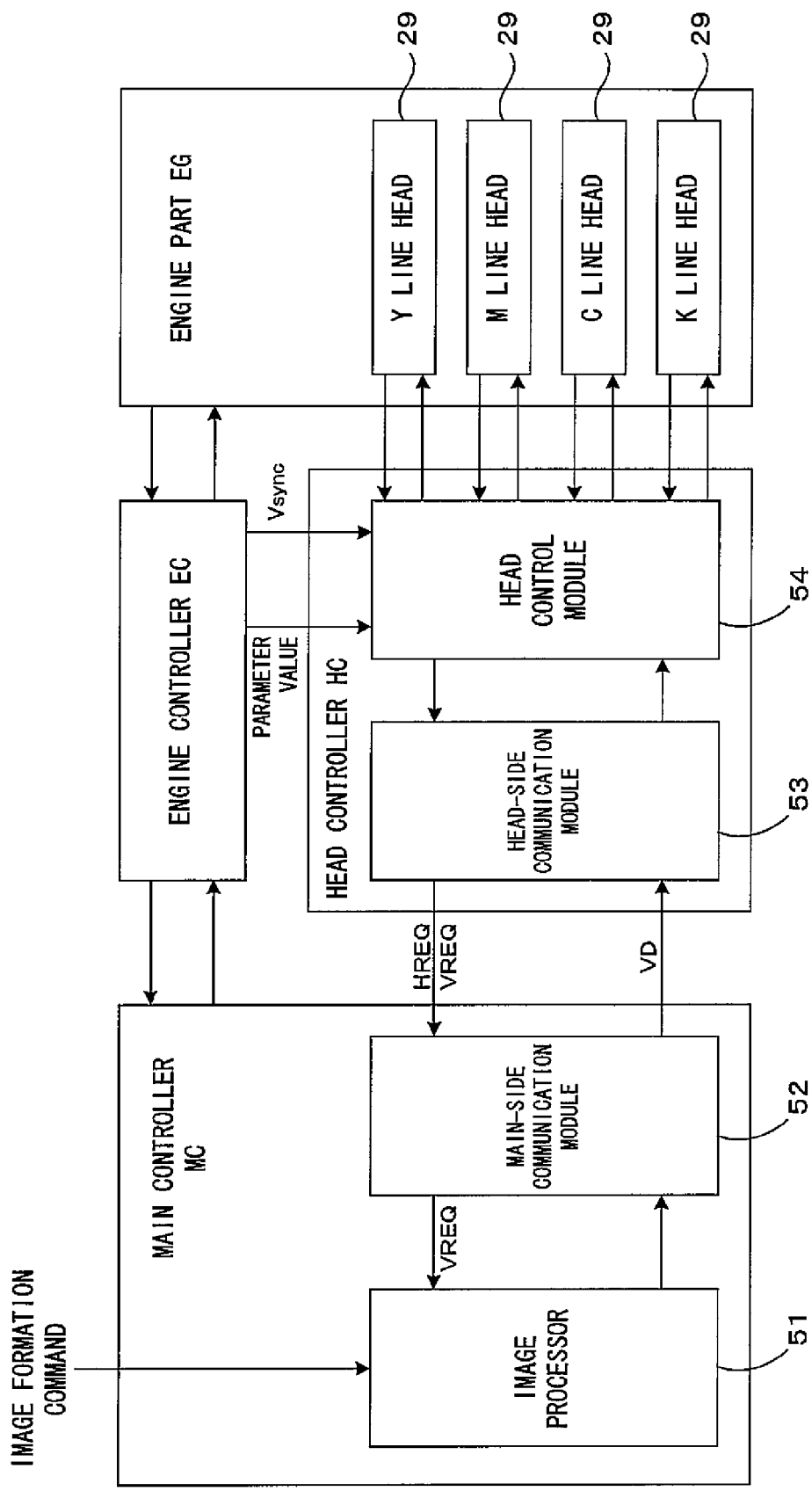
F I G. 4

F I G. 2 4

OPTICAL DATA

| ITEM | VALUE |
|---|---|
| WAVELENGTH | 690 nm |
| DIAMETER OF PHOTOSENSITIVE MEMBER | φ40 mm |

FIG. 25

DATA OF OPTICAL SYSTEMS INCLUDING LENS LS-m

| SURFACE NUMBER | SURFACE TYPE | CARVETURE RADIUS | SURFACE INTERVAL | REFRACTIVE INDEX | ABBE CONSTANT |
|---|---|---|---|---|---|
| S1 (OBJECT PLANE) | | ∞ | 0.55 | $n_d$=1.5168 | $v_d$=64.2 |
| S2 | | ∞ | 4.206 | | |
| S3 (APERTURE) | | ∞ | 0.03 | | |
| S4 | x-y POLYNOMIAL SURFACE | SEE FIG. 22 | 0.26 | $n_d$=1.53 | $v_d$=50.8 |
| S5 | | ∞ | 0.9 | $n_d$=1.541 | $v_d$=57 |
| S6 | | ∞ | 1.393 | | |
| S7 | x-y POLYNOMIAL SURFACE | SEE FIG. 23 | 0.29 | $n_d$=1.53 | $v_d$=50.8 |
| S8 | | ∞ | 0.9 | $n_d$=1.541 | $v_d$=57 |
| S9 | | ∞ | 0.879 | | |
| S10 (IMAGE PLANE) | | ∞ | | | |

FIG. 26

● DEFINITION OF x-y POLYNOMIAL SURFACE
EQUALITIES BELOW ARE USED $$z(x, y) = \frac{cr^2}{1 + \sqrt{1 - (1+k)c^2 r^2}} + \sum_{j=2}^{66} C_j x^n y^m$$

$$j = [(m+n)^2 + m + 3n]/2 + 1$$

WHERE
z: SAG OF SURFACE PARALLEL TO z-AXIS
c: CURVATURE AT APEX OF SURFACE
k: CONIC COEFFICIENT
Cj: COEFFICIENT OF MONOMIAL $x^m y^n$
x: x-AXIS (MAIN SCANNING DIRECTION) COORDINATE
y: y-AXIS (SUB SCANNING DIRECTION) COORDINATE

F I G. 27

VALUES OF COEFFICIENTS EXPRESSING SURFACES S4 OF OPTICAL SYSTEMS INCLUDING LENSES LS-m

| NAME OF COEFFICIENT | VALUE | NAME OF COEFFICIENT | | VALUE |
|---|---|---|---|---|
| CURVATURE c | 0.61583 | | | |
| CONIC CONSTANT k | -1.03580 | C34 | $x^2y^5$ | 0 |
| C2 | $x$ | 0 | C35 | $xy^6$ | 0 |
| C3 | $y$ | 0 | C36 | $y^7$ | 0 |
| C4 | $x^2$ | 0.029156 | C37 | $x^8$ | 0 |
| C5 | $xy$ | 0 | C38 | $x^7y$ | 0 |
| C6 | $y^2$ | 0.029554 | C39 | $x^6y^2$ | 0 |
| C7 | $x^3$ | 0 | C40 | $x^5y^3$ | 0 |
| C8 | $x^2y$ | 0 | C41 | $x^4y^4$ | 0 |
| C9 | $xy^2$ | 0 | C42 | $x^3y^5$ | 0 |
| C10 | $y^3$ | 0 | C43 | $x^2y^6$ | 0 |
| C11 | $x^4$ | 5.3207E-04 | C44 | $xy^7$ | 0 |
| C12 | $x^3y$ | 0 | C45 | $y^8$ | 0 |
| C13 | $x^2y^2$ | 4.6625E-03 | C46 | $x^9$ | 0 |
| C14 | $xy^3$ | 0 | C47 | $x^8y$ | 0 |
| C15 | $y^4$ | 3.2119E-03 | C48 | $x^7y^2$ | 0 |
| C16 | $x^5$ | 0 | C49 | $x^6y^3$ | 0 |
| C17 | $x^4y$ | 0 | C50 | $x^5y^4$ | 0 |
| C18 | $x^3y^2$ | 0 | C51 | $x^4y^5$ | 0 |
| C19 | $x^2y^3$ | 0 | C52 | $x^3y^6$ | 0 |
| C20 | $xy^4$ | 0 | C53 | $x^2y^7$ | 0 |
| C21 | $y^5$ | 0 | C54 | $xy^8$ | 0 |
| C22 | $x^6$ | 1.4859E-04 | C55 | $y^9$ | 0 |
| C23 | $x^5y$ | 0 | C56 | $x^{10}$ | 0 |
| C24 | $x^4y^2$ | -1.5016E-03 | C57 | $x^9y$ | 0 |
| C25 | $x^3y^3$ | 0 | C58 | $x^8y^2$ | 0 |
| C26 | $x^2y^4$ | 1.7973E-03 | C59 | $x^7y^3$ | 0 |
| C27 | $xy^5$ | 0 | C60 | $x^6y^4$ | 0 |
| C28 | $y^6$ | -2.7614E-03 | C61 | $x^5y^5$ | 0 |
| C29 | $x^7$ | 0 | C62 | $x^4y^6$ | 0 |
| C30 | $x^6y$ | 0 | C63 | $x^3y^7$ | 0 |
| C31 | $x^5y^2$ | 0 | C64 | $x^2y^8$ | 0 |
| C32 | $x^4y^3$ | 0 | C65 | $xy^9$ | 0 |
| C33 | $x^3y^4$ | 0 | C66 | $y^{10}$ | 0 |

FIG. 28

VALUES OF COEFFICIENTS EXPRESSING SURFACES S7 OF
OPTICAL SYSTEMS INCLUDING LENSES LS-m

| NAME OF COEFFICIENT | | VALUE | NAME OF COEFFICIENT | | VALUE |
|---|---|---|---|---|---|
| CURVATURE c | | 0.52055 | | | |
| CONIC CONSTANT k | | -7.15895 | C34 | $x^2y^5$ | 0 |
| C2 | $x$ | 0 | C35 | $xy^6$ | 0 |
| C3 | $y$ | 0 | C36 | $y^7$ | 0 |
| C4 | $x^2$ | 0.132693 | C37 | $x^8$ | 0 |
| C5 | $xy$ | 0 | C38 | $x^7y$ | 0 |
| C6 | $y^2$ | 0.127483 | C39 | $x^6y^2$ | 0 |
| C7 | $x^3$ | 0 | C40 | $x^5y^3$ | 0 |
| C8 | $x^2y$ | 0 | C41 | $x^4y^4$ | 0 |
| C9 | $xy^2$ | 0 | C42 | $x^3y^5$ | 0 |
| C10 | $y^3$ | 0 | C43 | $x^2y^6$ | 0 |
| C11 | $x^4$ | 8.7695E-02 | C44 | $xy^7$ | 0 |
| C12 | $x^3y$ | 0 | C45 | $y^8$ | 0 |
| C13 | $x^2y^2$ | 0.1537591 | C46 | $x^9$ | 0 |
| C14 | $xy^3$ | 0 | C47 | $x^8y$ | 0 |
| C15 | $y^4$ | 0.0699629 | C48 | $x^7y^2$ | 0 |
| C16 | $x^5$ | 0 | C49 | $x^6y^3$ | 0 |
| C17 | $x^4y$ | 0 | C50 | $x^5y^4$ | 0 |
| C18 | $x^3y^2$ | 0 | C51 | $x^4y^5$ | 0 |
| C19 | $x^2y^3$ | 0 | C52 | $x^3y^6$ | 0 |
| C20 | $xy^4$ | 0 | C53 | $x^2y^7$ | 0 |
| C21 | $y^5$ | 0 | C54 | $xy^8$ | 0 |
| C22 | $x^6$ | -0.07651391 | C55 | $y^9$ | 0 |
| C23 | $x^5y$ | 0 | C56 | $x^{10}$ | 0 |
| C24 | $x^4y^2$ | -0.2261404 | C57 | $x^9y$ | 0 |
| C25 | $x^3y^3$ | 0 | C58 | $x^8y^2$ | 0 |
| C26 | $x^2y^4$ | -0.2369140 | C59 | $x^7y^3$ | 0 |
| C27 | $xy^5$ | 0 | C60 | $x^6y^4$ | 0 |
| C28 | $y^6$ | -0.0296410 | C61 | $x^5y^5$ | 0 |
| C29 | $x^7$ | 0 | C62 | $x^4y^6$ | 0 |
| C30 | $x^6y$ | 0 | C63 | $x^3y^7$ | 0 |
| C31 | $x^5y^2$ | 0 | C64 | $x^2y^8$ | 0 |
| C32 | $x^4y^3$ | 0 | C65 | $xy^9$ | 0 |
| C33 | $x^3y^4$ | 0 | C66 | $y^{10}$ | 0 |

F I G. 29

DATA OF OPTICAL SYSTEMS INCLUDING LENSES LS-u, LS-d

| SURFACE NUMBER | SURFACE TYPE | CARVETURE RADIUS | SURFACE INTERVAL | REFRACTIVE INDEX | ABBE CONSTANT |
|---|---|---|---|---|---|
| S1 (OBJECT PLANE) | | ∞ | 0.55 | $n_d=1.5168$ | $v_d=64.2$ |
| S2 | | ∞ | 4.206 | | |
| S3 (APERTURE) | | ∞ | 0.04 | | |
| S4 | x-y POLYNOMIAL SURFACE | SEE FIG. 25 | 0.25 | $n_d=1.53$ | $v_d=50.8$ |
| S5 | | ∞ | 0.9 | $n_d=1.541$ | $v_d=57$ |
| S6 | | ∞ | 1.403 | | |
| S7 | x-y POLYNOMIAL SURFACE | SEE FIG. 26 | 0.28 | $n_d=1.53$ | $v_d=50.8$ |
| S8 | | ∞ | 0.9 | $n_d=1.541$ | $v_d=57$ |
| S9 | | ∞ | 0.957 | | |
| S10 (IMAGE PLANE) | | ∞ | | | |

FIG. 30

VALUES OF COEFFICIENTS EXPRESSING SURFACES S4 OF OPTICAL SYSTEMS INCLUDING LENSES LS-u, LS-d

| NAME OF COEFFICIENT | VALUE | NAME OF COEFFICIENT | | VALUE |
|---|---|---|---|---|
| CURVATURE c | 0.59789 | | | |
| CONIC CONSTANT k | −0.99318 | C34 | $x^2y^5$ | 0 |
| C2 | $x$ | 0 | C35 | $xy^6$ | 0 |
| C3 | $y$ | 0 | C36 | $y^7$ | 0 |
| C4 | $x^2$ | 0.024253 | C37 | $x^8$ | 0 |
| C5 | $xy$ | 0 | C38 | $x^7y$ | 0 |
| C6 | $y^2$ | 0.025321 | C39 | $x^6y^2$ | 0 |
| C7 | $x^3$ | 0 | C40 | $x^5y^3$ | 0 |
| C8 | $x^2y$ | 0 | C41 | $x^4y^4$ | 0 |
| C9 | $xy^2$ | 0 | C42 | $x^3y^5$ | 0 |
| C10 | $y^3$ | 0 | C43 | $x^2y^6$ | 0 |
| C11 | $x^4$ | −1.1642E−03 | C44 | $xy^7$ | 0 |
| C12 | $x^3y$ | 0 | C45 | $y^8$ | 0 |
| C13 | $x^2y^2$ | 3.5772E−04 | C46 | $x^9$ | 0 |
| C14 | $xy^3$ | 0 | C47 | $x^8y$ | 0 |
| C15 | $y^4$ | −3.6377E−04 | C48 | $x^7y^2$ | 0 |
| C16 | $x^5$ | 0 | C49 | $x^6y^3$ | 0 |
| C17 | $x^4y$ | 0 | C50 | $x^5y^4$ | 0 |
| C18 | $x^3y^2$ | 0 | C51 | $x^4y^5$ | 0 |
| C19 | $x^2y^3$ | 0 | C52 | $x^3y^6$ | 0 |
| C20 | $xy^4$ | 0 | C53 | $x^2y^7$ | 0 |
| C21 | $y^5$ | 0 | C54 | $xy^8$ | 0 |
| C22 | $x^6$ | 1.4859E−04 | C55 | $y^9$ | 0 |
| C23 | $x^5y$ | 0 | C56 | $x^{10}$ | 0 |
| C24 | $x^4y^2$ | −1.5016E−03 | C57 | $x^9y$ | 0 |
| C25 | $x^3y^3$ | 0 | C58 | $x^8y^2$ | 0 |
| C26 | $x^2y^4$ | 1.7973E−03 | C59 | $x^7y^3$ | 0 |
| C27 | $xy^5$ | 0 | C60 | $x^6y^4$ | 0 |
| C28 | $y^6$ | −2.7614E−03 | C61 | $x^5y^5$ | 0 |
| C29 | $x^7$ | 0 | C62 | $x^4y^6$ | 0 |
| C30 | $x^6y$ | 0 | C63 | $x^3y^7$ | 0 |
| C31 | $x^5y^2$ | 0 | C64 | $x^2y^8$ | 0 |
| C32 | $x^4y^3$ | 0 | C65 | $xy^9$ | 0 |
| C33 | $x^3y^4$ | 0 | C66 | $y^{10}$ | 0 |

FIG. 31

VALUES OF COEFFICIENTS EXPRESSING SURFACES S7 OF OPTICAL SYSTEMS INCLUDING LENSES LS-u, LS-d

| NAME OF COEFFICIENT | | VALUE | NAME OF COEFFICIENT | | VALUE |
|---|---|---|---|---|---|
| CURVATURE c | | 0.63428 | | | |
| CONIC CONSTANT k | | -5.48113 | C34 | $x^2y^5$ | 0 |
| C2 | $x$ | 0 | C35 | $xy^6$ | 0 |
| C3 | $y$ | 0 | C36 | $y^7$ | 0 |
| C4 | $x^2$ | 0.076729 | C37 | $x^8$ | 0 |
| C5 | $xy$ | 0 | C38 | $x^7y$ | 0 |
| C6 | $y^2$ | 0.070842 | C39 | $x^6y^2$ | 0 |
| C7 | $x^3$ | 0 | C40 | $x^5y^3$ | 0 |
| C8 | $x^2y$ | 0 | C41 | $x^4y^4$ | 0 |
| C9 | $xy^2$ | 0 | C42 | $x^3y^5$ | 0 |
| C10 | $y^3$ | 0 | C43 | $x^2y^6$ | 0 |
| C11 | $x^4$ | 1.1859E-01 | C44 | $xy^7$ | 0 |
| C12 | $x^3y$ | 0 | C45 | $y^8$ | 0 |
| C13 | $x^2y^2$ | 0.2325575 | C46 | $x^9$ | 0 |
| C14 | $xy^3$ | 0 | C47 | $x^8y$ | 0 |
| C15 | $y^4$ | 0.1200360 | C48 | $x^7y^2$ | 0 |
| C16 | $x^5$ | 0 | C49 | $x^6y^3$ | 0 |
| C17 | $x^4y$ | 0 | C50 | $x^5y^4$ | 0 |
| C18 | $x^3y^2$ | 0 | C51 | $x^4y^5$ | 0 |
| C19 | $x^2y^3$ | 0 | C52 | $x^3y^6$ | 0 |
| C20 | $xy^4$ | 0 | C53 | $x^2y^7$ | 0 |
| C21 | $y^5$ | 0 | C54 | $xy^8$ | 0 |
| C22 | $x^6$ | -0.07587761 | C55 | $y^9$ | 0 |
| C23 | $x^5y$ | 0 | C56 | $x^{10}$ | 0 |
| C24 | $x^4y^2$ | -0.2438945 | C57 | $x^9y$ | 0 |
| C25 | $x^3y^3$ | 0 | C58 | $x^8y^2$ | 0 |
| C26 | $x^2y^4$ | -0.2671152 | C59 | $x^7y^3$ | 0 |
| C27 | $xy^5$ | 0 | C60 | $x^6y^4$ | 0 |
| C28 | $y^6$ | -0.0673911 | C61 | $x^5y^5$ | 0 |
| C29 | $x^7$ | 0 | C62 | $x^4y^6$ | 0 |
| C30 | $x^6y$ | 0 | C63 | $x^3y^7$ | 0 |
| C31 | $x^5y^2$ | 0 | C64 | $x^2y^8$ | 0 |
| C32 | $x^4y^3$ | 0 | C65 | $xy^9$ | 0 |
| C33 | $x^3y^4$ | 0 | C66 | $y^{10}$ | 0 |

EXPOSURE HEAD AND AN IMAGE FORMING APPARATUS

CROSS REFERENCE TO RELATED APPLICATION

The disclosure of Japanese Patent Applications No. 2008-008939 filed on Jan. 18, 2008 and No. 2008-306479 filed on Dec. 1, 2008 including specification, drawings and claims is incorporated herein by reference in its entirety.

BACKGROUND

1. Technical Field

The invention relates to an exposure head and an image forming apparatus which use a lens array in which lenses are arranged.

2. Related Art

Known as such lens arrays include for example one in which lenses are arranged over predetermined pitches in a longitudinal direction as shown in FIG. 2 of JP-A-6-278314, etc. In this lens array, the lenses adjacent to each other in the longitudinal direction are at predetermined intervals from each other and each lens focuses incident light. Light focused by the respective lenses exposes a latent image carrier such as a photosensitive drum to form a latent image.

SUMMARY

By the way, a large amount of light impinging upon a lens is preferable for favorable exposure. One approach to achieve this is to increase the diameter of the lens. However, expansion of the diameter of the lenses which are arranged at predetermined intervals in the longitudinal direction (first direction) in the structure above increases the lens pitches in the longitudinal direction (first direction) and could result in a failure to attain a desired resolution. In other words, the related techniques could sacrifice the resolution for increase of incident light in some instances.

An advantage of some aspects of the invention is to provide a technique which makes it possible to guide a large amount of light into lenses even at a high resolution and hence realize excellent exposure.

According to a first aspect of the invention, there is provided an exposure head, comprising: a lens array that includes a light transmissive substrate whose length in a first direction is greater than a length thereof in a second direction orthogonal to the first direction, a first lens that is arranged on the light transmissive substrate, and a second lens that is arranged on the light transmissive substrate at the first direction of the first lens, the first lens and the second lens being connected in the first direction; and a head substrate that is provided with a first light emitting element that emits a light toward the first lens and a second light emitting element that emits a light toward the second lens.

In the exposure head having such a structure, the first lens and the second lens are connected in the first direction. Hence, it is possible to make a large amount of light impinge upon the first and the second lenses without widening an interval between the first lens and the second lens in the first direction and to realize excellent exposure.

According to a second aspect of the invention, there is provided an exposure head, comprising: a lens array that includes a light transmissive substrate whose length in a first direction is greater than a length thereof in a second direction orthogonal to the first direction, a first lens that is arranged on the light transmissive substrate, and a second lens that is arranged on the light transmissive substrate at the first direction of the first lens, the first lens and the second lens being connected in the first direction; a light emitting element that emits a light to be imaged by the first lens; and a light emitting element that emits a light to be imaged by the second lens, wherein a formula below is satisfied: $f(p/2, 0) < h$ where a position of an apex of the first lens is a first position, the symbol x denotes a position in the first direction measured from a point of origin which is the first position, the symbol y denotes a position in the second direction measured from the point of origin which is the first position, the symbol h denotes a height from the light transmissive substrate to the apex of the first lens at the first position, the symbol $f(x, y)$ denotes a height to the first position from a lens surface of the first or the second lens at a coordinate $(x, y)$, and the symbol p denotes an interval between the first lens and the second lens in the first direction.

In the exposure head having this structure, the first lens and the second lens become connected in the first direction. It is therefore possible to make a large amount of light impinge upon the first lens and the second lens without widening an interval between the first lens and the second lens in the first direction and to realize excellent exposure.

According to a third aspect of the invention, there is provided an image forming apparatus, comprising: a latent image carrier; and an exposure head that exposes the latent image carrier and includes a lens array and a head substrate, the lens array having a light transmissive substrate whose length in a first direction is greater than a length thereof in a second direction orthogonal to the first direction, a first lens that is arranged on the light transmissive substrate, and a second lens that is arranged on the light transmissive substrate at the first direction of the first lens, the first lens and the second lens being connected in the first direction, the head substrate being provided with a first light emitting element that emits a light to be imaged on the latent image carrier by the first lens and a second light emitting element that emits a light to be imaged on the latent image carrier by the second lens.

In the image forming apparatus having this structure, the first lens and the second lens are connected in the first direction. It is therefore possible to make a large amount of light impinge upon the first lens and the second lens without widening an interval between the first lens and the second lens in the first direction and to realize excellent exposure.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 4 is a diagram showing the electrical construction of the image forming apparatus of FIG. 3.

FIG. 24 is a table showing optical data according to this example.

FIG. 25 is a table showing the data of the optical systems which include the middle lenses.

FIG. 26 is a drawing of definitional equations which define the X-Y polynomial surfaces.

FIG. 27 is a table of the coefficients indicative of the surfaces S4 of the optical systems which include the middle lenses.

FIG. 28 is a table of the coefficients indicative of the surfaces S7 of the optical systems which include the middle lenses.

FIG. 29 is a table showing the data of the optical systems which include the upstream lenses and the downstream lenses.

FIG. 30 is a table of the coefficients which are indicative of the surfaces S4 of the optical systems which include the upstream lenses and the downstream lenses.

FIG. 31 is a table of the coefficients which are indicative of the surfaces S7 of the optical systems which include the upstream lenses and the downstream lenses.

DESCRIPTION OF EXEMPLARY EMBODIMENTS

Terms used in this specification are first described below (see "A. Description of Terms"). Following this description of terms, embodiments of the invention (see "B-1. First Embodiment" and "B-2. Second Embodiment" and the like) are described.

A. DESCRIPTION OF TERMS

Figure 1:
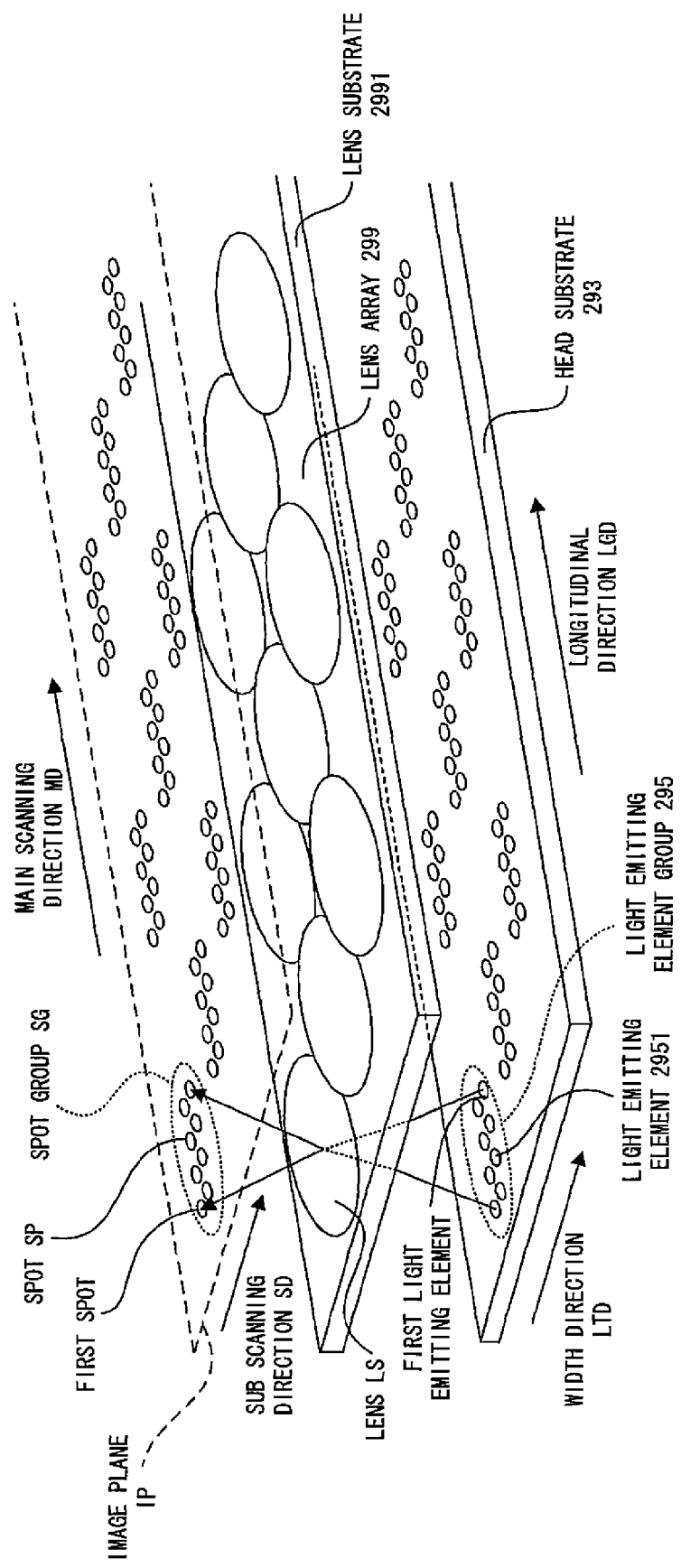
FIGS. 1 and 2 are diagrams showing terminology used in this specification.
Figure 2:
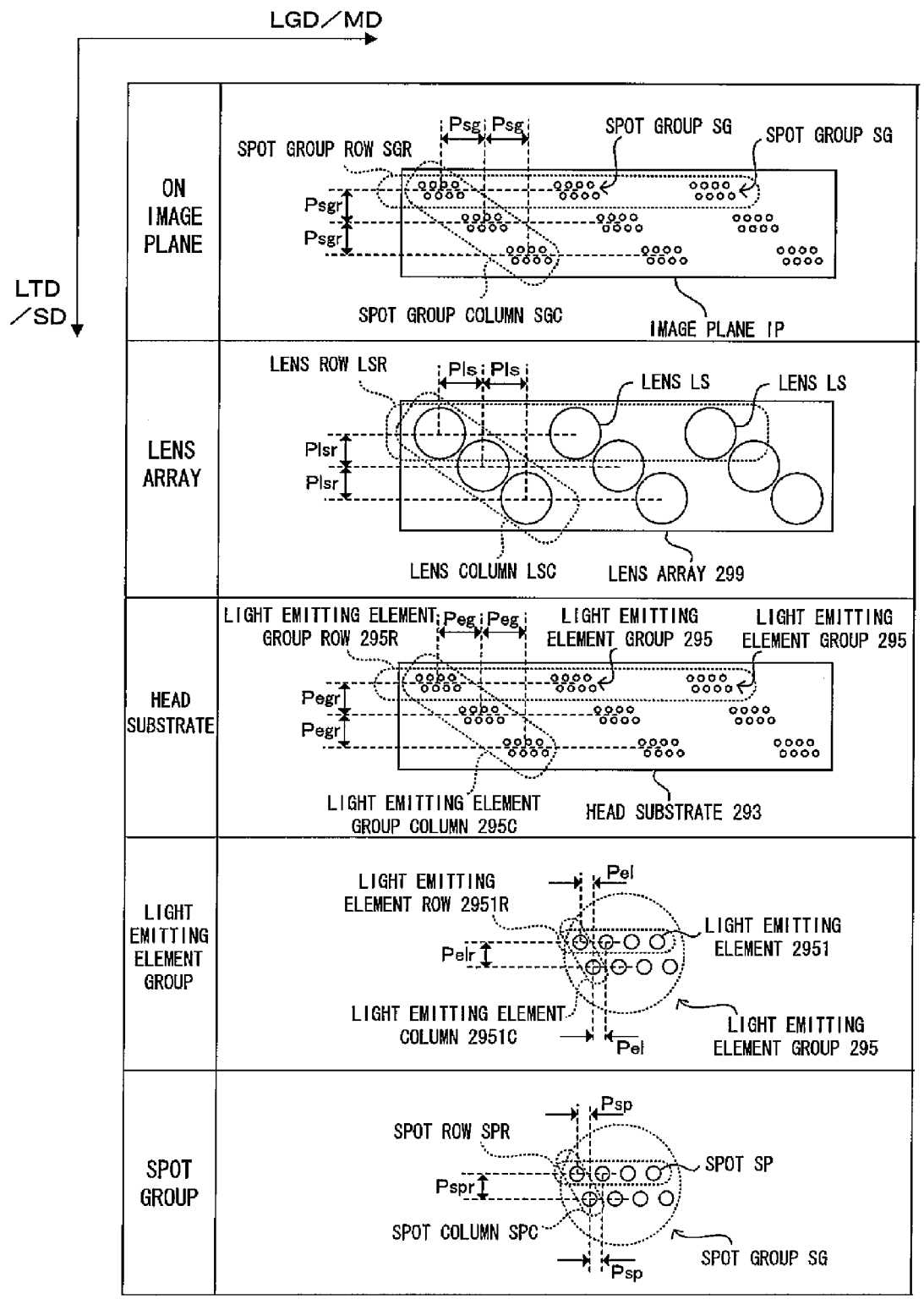

FIGS. 1 and 2 are diagrams showing terminology used in this specification. Here, terminology used in this specification is organized with reference to FIGS. 1 and 2. In this specification, a conveying direction of a surface (image plane IP) of a photosensitive drum 21 is defined to be a sub scanning direction SD and a direction orthogonal to or substantially orthogonal to the sub scanning direction SD is defined to be a main scanning direction MD. Further, a line head 29 is arranged relative to the surface (image plane IP) of the photosensitive drum 21 such that its longitudinal direction LGD corresponds to the main scanning direction MD and its width direction LTD corresponds to the sub scanning direction SD.

Collections of a plurality of (eight in FIGS. 1 and 2) light emitting elements 2951 arranged on the head substrate 293 in one-to-one correspondence with the plurality of lenses LS of the lens array 299 are defined to be light emitting element groups 295. In other words, in the head substrate 293, the plurality of light emitting element groups 295 including a plurality of light emitting elements 2951 are arranged in conformity with the plurality of lenses LS, respectively. Further, collections of a plurality of spots SP formed on the image plane IP by light beams from the light emitting element groups 295 imaged on the image plane IP by the lenses LS corresponding to the light emitting element groups 295 are defined to be spot groups SG. In other words, a plurality of spot groups SG can be formed in one-to-one correspondence with the plurality of light emitting element groups 295. In each spot group SG, the most upstream spot in the main scanning direction MD and the sub scanning direction SD is particularly defined to be a first spot. The light emitting element 2951 corresponding to the first spot is particularly defined to be a first light emitting element.

A spot group row SGR and a spot group column SGC are defined as shown in the column "On Image Plane" of FIG. 2. Specifically, a plurality of spot groups SG arranged in the main scanning direction MD are defined as the spot group row SGR. A plurality of spot group rows SGR are arranged at specified spot group row pitches Psgr in the sub scanning direction SD. Further, a plurality of (three in FIG. 2) spot groups SG arranged at spot group row pitches Psgr in the sub scanning direction SD and at spot group pitches Psg in the main scanning direction MD are defined as the spot group column SGC. The spot group row pitch Psgr is a distance in the sub scanning direction SD between the geometric centers of gravity of two spot group rows SGR adjacent in the sub scanning direction SD, and the spot group pitch Psg is a distance in the main scanning direction MD between the geometric centers of gravity of two spot groups SG adjacent in the main scanning direction MD.

Lens rows LSR and lens columns LSC are defined as shown in the column of "Lens Array" of FIG. 2. Specifically, a plurality of lenses LS aligned in the longitudinal direction LGD is defined to be the lens row LSR. A plurality of lens rows LSR are arranged at specified lens row pitches Plsr in the width direction LTD. Further, a plurality of (three in FIG. 2) lenses LS arranged at the lens row pitches Plsr in the width direction LTD and at lens pitches Pls in the longitudinal direction LGD are defined to be the lens column LSC. It should be noted that the lens row pitch Plsr is a distance in the width direction LTD between the geometric centers of gravity of two lens rows LSR adjacent in the width direction LTD, and that the lens pitch Pls is a distance in the longitudinal direction LGD between the geometric centers of gravity of two lenses LS adjacent in the longitudinal direction LGD.

Light emitting element group rows 295R and light emitting element group columns 295C are defined as in the column "Head Substrate" of FIG. 2. Specifically, a plurality of light emitting element groups 295 aligned in the longitudinal direction LGD is defined to be the light emitting element group row 295R. A plurality of light emitting element group rows 295R are arranged at specified light emitting element group row pitches Pegr in the width direction LTD. Further, a plurality of (three in FIG. 2) light emitting element groups 295 arranged at the light emitting element group row pitches Pegr in the width direction LTD and at light emitting element group pitches Peg in the longitudinal direction LGD are defined to be the light emitting element group column 295C. It should be noted that the light emitting element group row pitch Pegr is a distance in the width direction LTD between the geometric centers of gravity of two light emitting element group rows 295R adjacent in the width direction LTD, and that the light emitting element group pitch Peg is a distance in the longitudinal direction LGD between the geometric centers of gravity of two light emitting element groups 295 adjacent in the longitudinal direction LGD.

Light emitting element rows 2951R and light emitting element columns 2951C are defined as in the column "Light Emitting Element Group" of FIG. 2. Specifically, in each light emitting element group 295, a plurality of light emitting elements 2951 aligned in the longitudinal direction LGD is defined to be the light emitting element row 2951R. A plurality of light emitting element rows 2951R are arranged at specified light emitting element row pitches Pelr in the width direction LTD. Further, a plurality of (two in FIG. 2) light emitting elements 2951 arranged at the light emitting element row pitches Pelr in the width direction LTD and at light emitting element pitches Pel in the longitudinal direction LGD are defined to be the light emitting element column 2951C. It should be noted that the light emitting element row pitch Pelr is a distance in the width direction LTD between the geometric centers of gravity of two light emitting element rows 2951R adjacent in the width direction LTD, and that the light emitting element pitch Pel is a distance in the longitudinal direction LGD between the geometric centers of gravity of two light emitting elements 2951 adjacent in the longitudinal direction LGD.

Spot rows SPR and spot columns SPC are defined as shown in the column "Spot Group" of FIG. 2. Specifically, in each spot group SG, a plurality of spots SP aligned in the longitudinal direction LGD is defined to be the spot row SPR. A plurality of spot rows SPR are arranged at specified spot row pitches Pspr in the width direction LTD. Further, a plurality of (two in FIG. 2) spots arranged at the spot row pitches Pspr in the width direction LTD and at spot pitches Psp in the longitudinal direction LGD are defined to be the spot column SPC. It should be noted that the spot row pitch Pspr is a distance in the sub scanning direction SD between the geometric centers of gravity of two spot rows SPR adjacent in the sub scanning direction SD, and that the spot pitch Psp is a distance in the main scanning direction MD between the geometric centers of gravity of two spots SP adjacent in the main scanning direction MD.

B-1. FIRST EMBODIMENT

Figure 3:
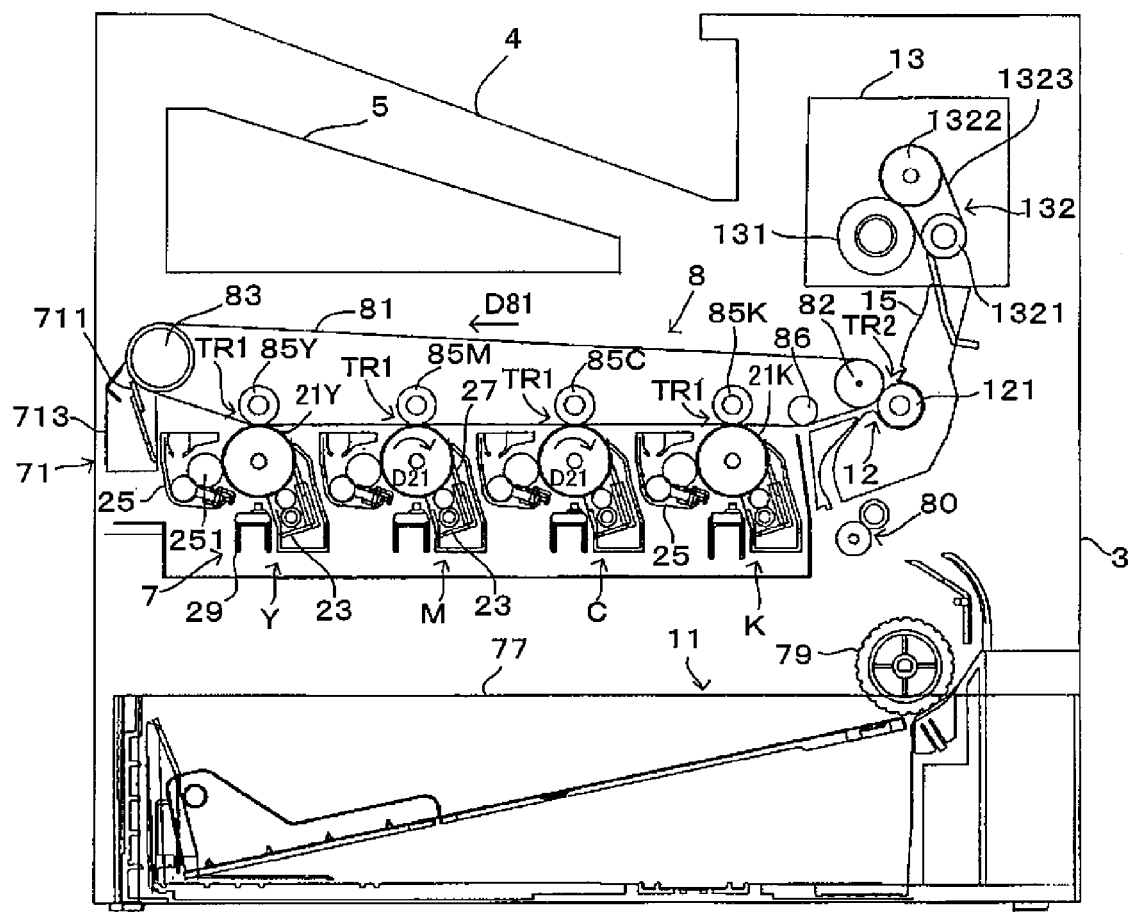
FIG. 3 is a diagram showing an embodiment of an image forming apparatus including a line head as an application subject of the invention.

FIG. 3 is a diagram showing an embodiment of an image forming apparatus including a line head as an application subject of the invention. FIG. 4 is a diagram showing the electrical construction of the image forming apparatus of FIG. 3. This apparatus is an image forming apparatus that can selectively execute a color mode for forming a color image by superimposing four color toners of black (K), cyan (C), magenta (M) and yellow (Y) and a monochromatic mode for forming a monochromatic image using only black (K) toner. FIG. 3 is a diagram corresponding to the execution of the color mode. In this image forming apparatus, when an image formation command is given from an external apparatus such as a host computer to a main controller MC having a CPU and memories, the main controller MC feeds a control signal and the like to an engine controller EC and feeds video data VD corresponding to the image formation command to a head controller HC. This head controller HC controls line heads 29 of the respective colors based on the video data VD from the main controller MC, a vertical synchronization signal Vsync from the engine controller EC and parameter values from the engine controller EC. In this way, an engine part EG performs a specified image forming operation to form an image corresponding to the image formation command on a sheet such as a copy sheet, transfer sheet, form sheet or transparent sheet for OHP.

An electrical component box 5 having a power supply circuit board, the main controller MC, the engine controller EC and the head controller HC built therein is disposed in a housing main body 3 of the image forming apparatus. An image forming unit 7, a transfer belt unit 8 and a sheet feeding unit 11 are also arranged in the housing main body 3. A secondary transfer unit 12, a fixing unit 13 and a sheet guiding member 15 are arranged at the right side in the housing main body 3 in FIG. 3. It should be noted that the sheet feeding unit 11 is detachably mountable into the housing main body 3. The sheet feeding unit 11 and the transfer belt unit 8 are so constructed as to be detachable for repair or exchange respectively.

The image forming unit 7 includes four image forming stations Y (for yellow), M (for magenta), C (for cyan) and K (for black) which form a plurality of images having different colors. Each of the image forming stations Y, M, C and K includes a cylindrical photosensitive drum 21 having a surface of a specified length in a main scanning direction MD. Each of the image forming stations Y, M, C and K forms a toner image of the corresponding color on the surface of the photosensitive drum 21. The photosensitive drum is arranged so that the axial direction thereof is substantially parallel to the main scanning direction MD. Each photosensitive drum 21 is connected to its own driving motor and is driven to rotate at a specified speed in a direction of arrow D21 in FIG. 3, whereby the surface of the photosensitive drum 21 is transported in the sub scanning direction SD which is orthogonal to or substantially orthogonal to the main scanning direction NM. Further, a charger 23, the line head 29, a developer 25 and a photosensitive drum cleaner 27 are arranged in a rotating direction around each photosensitive drum 21. A charging operation, a latent image forming operation and a toner developing operation are performed by these functional sections. Accordingly, a color image is formed by superimposing toner images formed by all the image forming stations Y, M, C and K on a transfer belt 81 of the transfer belt unit 8 at the time of executing the color mode, and a monochromatic image is formed using only a toner image formed by the image forming station K at the time of executing the monochromatic mode. Meanwhile, since the respective image forming stations of the image forming unit 7 are identically constructed, reference characters are given to only some of the image forming stations while being not given to the other image forming stations in order to facilitate the diagrammatic representation in FIG. 3.

The charger 23 includes a charging roller having the surface thereof made of an elastic rubber. This charging roller is constructed to be rotated by being held in contact with the surface of the photosensitive drum 21 at a charging position. As the photosensitive drum 21 rotates, the charging roller is rotated at the same circumferential speed in a direction driven by the photosensitive drum 21. This charging roller is connected to a charging bias generator (not shown) and charges the surface of the photosensitive drum 21 at the charging position where the charger 23 and the photosensitive drum 21 are in contact upon receiving the supply of a charging bias from the charging bias generator.

The line head 29 is arranged relative to the photosensitive drum 21 so that the longitudinal direction thereof corresponds to the main scanning direction MD and the width direction thereof corresponds to the sub scanning direction SD. Hence, the longitudinal direction of the line head 29 is substantially parallel to the main scanning direction MD. The line head 29 includes a plurality of light emitting elements arrayed in the longitudinal direction and is positioned separated from the photosensitive drum 21. Light beams are emitted from these light emitting elements toward the surface of the photosensitive drum 21 charged by the charger 23, thereby forming an electrostatic latent image on this surface.

The developer 25 includes a developing roller 251 carrying toner on the surface thereof. By a development bias applied to the developing roller 251 from a development bias generator (not shown) electrically connected to the developing roller 251, charged toner is transferred from the developing roller 251 to the photosensitive drum 21 to develop the latent image formed by the line head 29 at a development position where the developing roller 251 and the photosensitive drum 21 are in contact.

The toner image developed at the development position in this way is primarily transferred to the transfer belt 81 at a primary transfer position TR1 to be described later where the transfer belt 81 and each photosensitive drum 21 are in contact after being transported in the rotating direction D21 of the photosensitive drum 21.

Further, the photosensitive drum cleaner 27 is disposed in contact with the surface of the photosensitive drum 21 downstream of the primary transfer position TR1 and upstream of the charger 23 with respect to the rotating direction D21 of the photosensitive drum 21. This photosensitive drum cleaner 27 removes the toner remaining on the surface of the photosensitive drum 21 to clean after the primary transfer by being held in contact with the surface of the photosensitive drum.

The transfer belt unit 8 includes a driving roller 82, a driven roller (blade facing roller) 83 arranged to the left of the driving roller 82 in FIG. 3, and the transfer belt 81 mounted on these rollers. The transfer belt unit 8 also includes four primary transfer rollers 85Y, 85M, 85C and 85K arranged to face in a one-to-one relationship with the photosensitive drums 21 of the respective image forming stations Y, M, C and K inside the transfer belt 81 when the photosensitive cartridges are mounted. These primary transfer rollers 85Y, 85M, 85C and 85K are respectively electrically connected to a primary transfer bias generator (not shown). As described in detail later, at the time of executing the color mode, all the primary transfer rollers 85Y, 85M, 85C and 85K are positioned on the sides of the image forming stations Y, M, C and K as shown in FIG. 3, whereby the transfer belt 81 is pressed into contact with the photosensitive drums 21 of the image forming stations Y, M, C and K to form the primary transfer positions TR1 between the respective photosensitive drums 21 and the transfer belt 81. By applying primary transfer biases from the primary transfer bias generator to the primary transfer rollers 85Y, 85M, 85C and 85K at suitable timings, the toner images formed on the surfaces of the respective photosensitive drums 21 are transferred to the surface of the transfer belt 81 at the corresponding primary transfer positions TR1 to form a color image.

On the other hand, out of the four primary transfer rollers 85Y, 85M, 85C and 85K, the color primary transfer rollers 85Y, 85M, 85C are separated from the facing image forming stations Y, M and C and only the monochromatic primary transfer roller 85K is brought into contact with the image forming station K at the time of executing the monochromatic mode, whereby only the monochromatic image forming station K is brought into contact with the transfer belt 81. As a result, the primary transfer position TR1 is formed only between the monochromatic primary transfer roller 85K and the image forming station K. By applying a primary transfer bias at a suitable timing from the primary transfer bias generator to the monochromatic primary transfer roller 85K, the toner image formed on the surface of the photosensitive drum 21 is transferred to the surface of the transfer belt 81 at the primary transfer position TR1 to form a monochromatic image.

The transfer belt unit 8 further includes a downstream guide roller 86 disposed downstream of the monochromatic primary transfer roller 85K and upstream of the driving roller 82. This downstream guide roller 86 is so disposed as to come into contact with the transfer belt 81 on an internal common tangent to the primary transfer roller 85K and the photosensitive drum 21 at the primary transfer position TR1 formed by the contact of the monochromatic primary transfer roller 85K with the photosensitive drum 21 of the image forming station K.

The driving roller 82 drives to rotate the transfer belt 81 in the direction of the arrow D81 and doubles as a backup roller for a secondary transfer roller 121. A rubber layer having a thickness of about 3 mm and a volume resistivity of 1000 kΩ·cm or lower is formed on the circumferential surface of the driving roller 82 and is grounded via a metal shaft, thereby serving as an electrical conductive path for a secondary transfer bias to be supplied from an unillustrated secondary transfer bias generator via the secondary transfer roller 121. By providing the driving roller 82 with the rubber layer having high friction and shock absorption, an impact caused upon the entrance of a sheet into a contact part (secondary transfer position TR2) of the driving roller 82 and the secondary transfer roller 121 is unlikely to be transmitted to the transfer belt 81 and image deterioration can be prevented.

The sheet feeding unit 11 includes a sheet feeding section which has a sheet cassette 77 capable of holding a stack of sheets, and a pickup roller 79 which feeds the sheets one by one from the sheet cassette 77. The sheet fed from the sheet feeding section by the pickup roller 79 is fed to the secondary transfer position TR2 along the sheet guiding member 15 after having a sheet feed timing adjusted by a pair of registration rollers 80.

The secondary transfer roller 121 is provided freely to abut on and move away from the transfer belt 81, and is driven to abut on and move away from the transfer belt 81 by a secondary transfer roller driving mechanism (not shown). The fixing unit 13 includes a heating roller 131 which is freely rotatable and has a heating element such as a halogen heater built therein, and a pressing section 132 which presses this heating roller 131. The sheet having an image secondarily transferred to the front side thereof is guided by the sheet guiding member 15 to a nip portion formed between the heating roller 131 and a pressure belt 1323 of the pressing section 132, and the image is thermally fixed at a specified temperature in this nip portion. The pressing section 132 includes two rollers 1321 and 1322 and the pressure belt 1323 mounted on these rollers. Out of the surface of the pressure belt 1323, a part stretched by the two rollers 1321 and 1322 is pressed against the circumferential surface of the heating roller 131, thereby forming a sufficiently wide nip portion between the heating roller 131 and the pressure belt 1323. The sheet having been subjected to the image fixing operation in this way is transported to the discharge tray 4 provided on the upper surface of the housing main body 3.

Further, a cleaner 71 is disposed facing the blade facing roller 83 in this apparatus. The cleaner 71 includes a cleaner blade 711 and a waste toner box 713. The cleaner blade 711 removes foreign matters such as toner remaining on the transfer belt after the secondary transfer and paper powder by holding the leading end thereof in contact with the blade facing roller 83 via the transfer belt 81. Foreign matters thus removed are collected into the waste toner box 713. Further, the cleaner blade 711 and the waste toner box 713 are constructed integral to the blade facing roller 83. Accordingly, if the blade facing roller 83 moves, the cleaner blade 711 and the waste toner box 713 move together with the blade facing roller 83.

Figure 5:
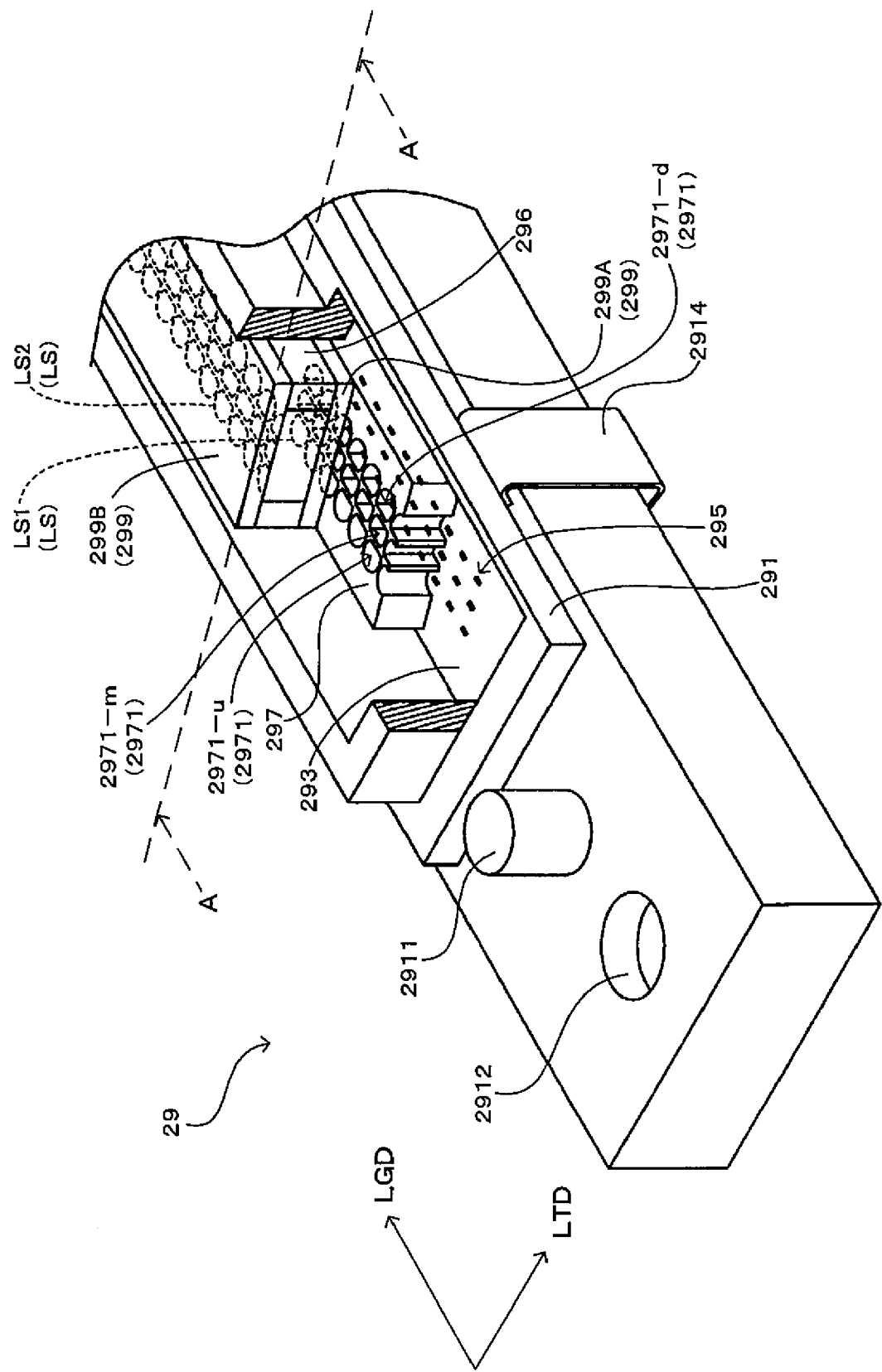
FIG. 5 is a schematic perspective view which shows a line head according to a first embodiment.
Figure 6:
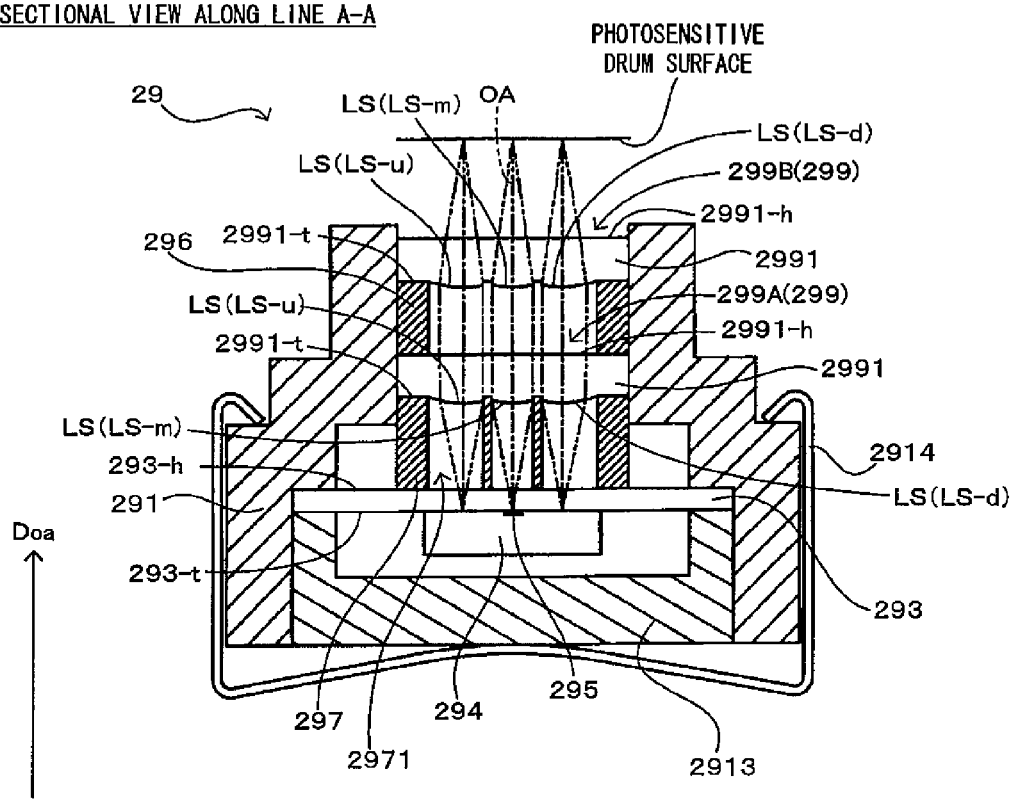
FIG. 6 is a partial cross sectional view of the line head of FIG. 5 taken along the A-A line.

FIG. 5 is a schematic perspective view which shows a line head according to a first embodiment. FIG. 6 is a partial cross sectional view of the line head of FIG. 5 taken along the A-A line. The A-A line is a line which includes the optical axes of lenses which form a lens column which will be described later, and the cross section in FIG. 6 is a cross section which includes the A-A line and which is parallel to the optical axes of the lenses. As described above, the line head 29 is arranged relative to the photosensitive drum 21 such that the longitudinal direction LGD thereof corresponds to the main scanning direction MD and the width direction LTD thereof corresponds to the sub scanning direction SD. The longitudinal direction LGD and the width direction LTD are orthogonal to or substantially orthogonal to each other. As described later, in this line head 29, a plurality of light emitting elements are formed on the head substrate 293 and the respective light emitting elements emit light beams toward the surface of the photosensitive drum 21. Accordingly, in this specification, a direction orthogonal to the longitudinal direction LGD and the width direction LTD and propagating from the light emitting elements toward the photosensitive drum surface is referred to as a light beam propagation direction Doa. This light beam propagation direction Doa is parallel to or substantially parallel to optical axes OA to be described later.

The line head 29 includes a case 291, and a positioning pin 2911 and a screw insertion hole 2912 are provided at each of the opposite ends of such a case 291 in the longitudinal direction LGD. The line head 29 is positioned relative to the photosensitive drum 21 by fitting such positioning pins 2911 into positioning holes (not shown) perforated in a photosensitive drum cover (not shown) covering the photosensitive drum 21 and positioned relative to the photosensitive drum 21. Further, the line head 29 is positioned and fixed relative to the photosensitive drum 21 by screwing fixing screws into screw holes (not shown) of the photosensitive drum cover via the screw insertion holes 2912 to be fixed.

The head substrate 293, a light shielding member 297 and two lens arrays 299 (299A, 299B) are arranged in the case 291. The inner side of the case 291 is held in contact with a top surface 293-h of the head substrate 293, whereas an under lid 2913 is held in contact with an under surface 293-t of the head substrate 293. This under lid 2913 is pressed against the inner side of the case 291 via the head substrate 293 by fixing devices 2914. In other words, the fixing devices 2914 have elastic forces for pressing the under lid 2913 toward the inner side (upper side in FIG. 6) of the case 291 and the interior of the case 291 is light-tightly sealed (in other words, so that light does not leak from the interior of the case 291 and light does not enter the case 291 from the outside) by the under lid being pressed by such elastic forces. The fixing devices 2914 are provided at a plurality of positions spaced apart in the longitudinal direction LGD of the case 291.

The light emitting element groups 295 formed by grouping a plurality of light emitting elements are provided on the under surface 293-t of the head substrate 293. The head substrate 293 is made of a light transmissive material such as glass, and light beams emitted from the respective light emitting elements of the light emitting element groups 295 can transmit from the under surface 293-t of the head substrate 293 to the top surface 293-h thereof. These light emitting elements are bottom emission-type organic EL (electro-luminescence) elements and are covered by a sealing member 294. The detailed arrangement of the light emitting elements on the under surface 293-t of the head substrate 293 is as follows.

Figure 7:
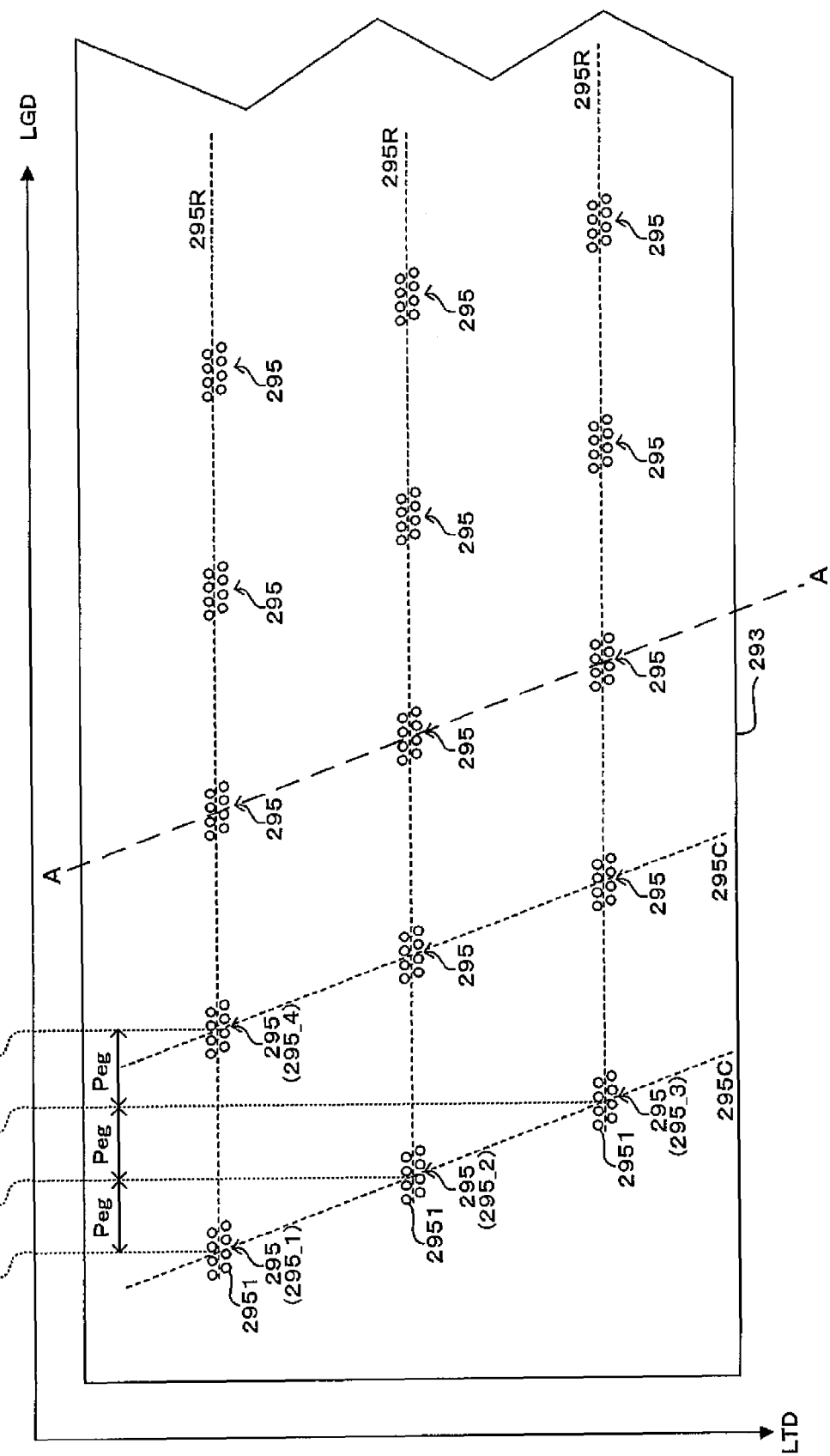
FIG. 7 is a diagram showing the configuration of the under surface of the head substrate.
Figure 8:
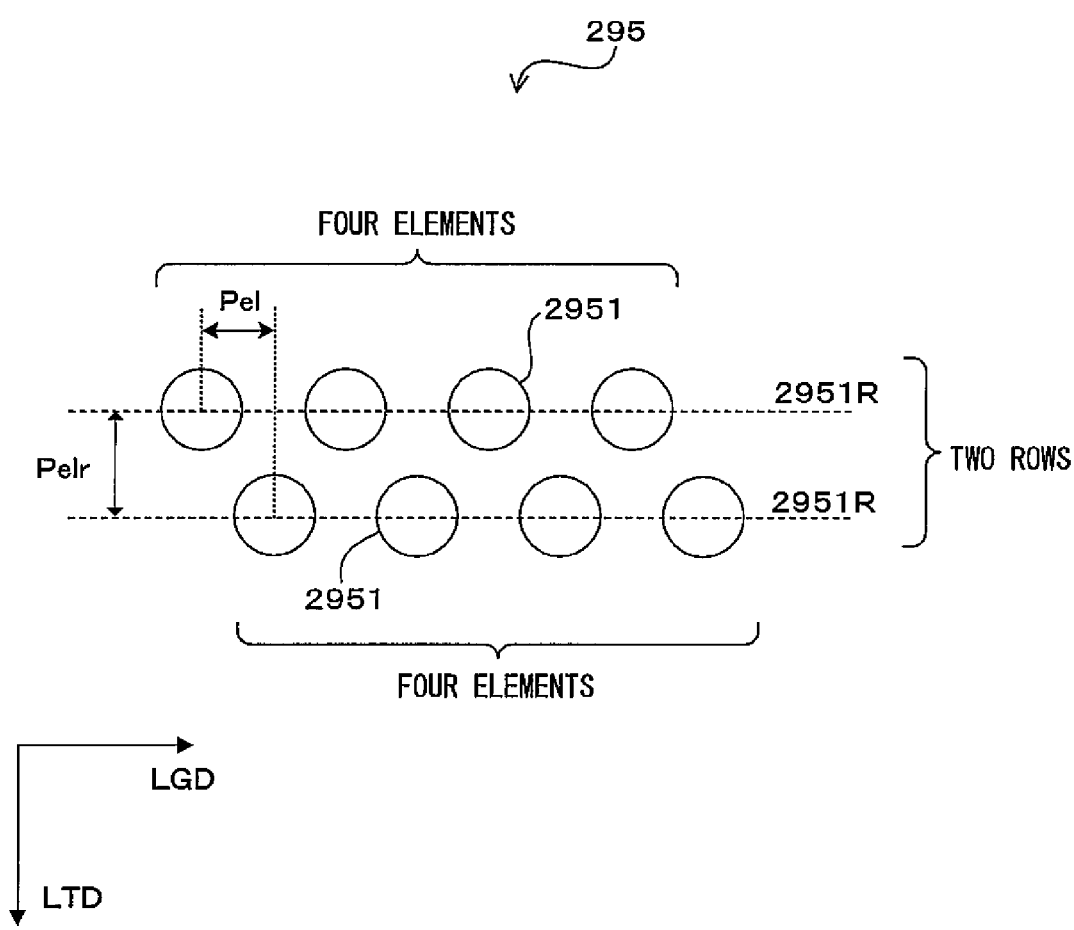
FIG. 8 is a diagram showing the configuration of the light emitting element group provided on the under surface of the head substrate.

FIG. 7 is a diagram showing the configuration of the under surface of the head substrate and corresponds to a case where the under surface is seen from the top surface of the head substrate. FIG. 8 is a diagram showing the configuration of the light emitting element group provided on the under surface of the head substrate. As shown in FIG. 7, the light emitting element group 295 is formed by grouping eight light emitting elements 2951. In each light emitting element group 295, eight light emitting elements 2951 are arranged as follows. Specifically, as shown in FIG. 8, in the light emitting element group 295, four light emitting elements 2951 are aligned in the longitudinal direction LGD to form a light emitting element row 2951R and two light emitting element rows 2951R are arranged at a light emitting element row pitch Pelr in the width direction LTD. The respective light emitting element rows 2951R are displaced from each other by a light emitting element pitch Pel in the longitudinal direction LGD, so that the positions of the respective light emitting elements 2951 in the longitudinal direction LGD differ from each other.

A plurality of light emitting element groups 295 thus configured are arranged on the under surface 293-t of the head substrate 293. Specifically, three light emitting element groups 295 are arranged at positions mutually different in the width direction LTD to form a light emitting element group column 295C, and a plurality of light emitting element group columns 295C are arranged in the longitudinal direction LGD. In each light emitting element group column 295C, three light emitting element groups 295 are at shifted positions from each other by the light emitting element group pitches Peg in the longitudinal direction LGD. In consequence, the positions PTE of the respective light emitting element groups 295 in the longitudinal direction LGD are different from each other. In other words, three light emitting element group rows 295R each formed by aligning a plurality of light emitting element groups 295 in the longitudinal direction LGD are arranged in the width direction LTD on the under surface 293-t of the head substrate 293. The respective light emitting element group rows 295R are displaced from each other by the light emitting element group pitches Peg in the longitudinal direction LGD. As a result, the positions PTE of the respective light emitting element groups 295 in the longitudinal direction LGD mutually differ. Thus, in this embodiment, a plurality of light emitting element groups 295 are two-dimensionally arranged on the head substrate 293. In FIG. 7, the positions of the light emitting element groups 295 are represented by the center of gravity positions of the light emitting element groups 295, and the positions PTE of the light emitting element groups 295 in the longitudinal direction LGD are indicated by feet of perpendiculars to an axis of the longitudinal direction LGD from the positions of the light emitting element groups 295.

The respective light emitting elements 2951 formed on the head substrate 293 in this way emit light beams having an equal wavelength upon being driven, for example, by a TFT (Thin Film Transistor) circuit or the like. The light emitting surfaces of the light emitting elements 2951 are so-called perfectly diffusing surface illuminants and the light beams emitted from the light emitting surfaces comply with Lambert's cosine law.

Referring back to FIGS. 5 and 6, description continues. The light shielding member 297 is arranged in contact with the top surface 293-h of the head substrate 293. The light shielding member 297 is provided with light guide holes 2971 for the respective plurality of light emitting element groups 295. In other words, a plurality of light guide holes 2971 are formed in a one-to-one correspondence with the plurality of light emitting element groups 295. The light guide holes 2971 are formed as holes penetrating the light shielding member 297 in the light beam propagation direction Doa. Further, two lens arrays 299 are arranged side by side in the light beam propagation direction Doa above the light shielding member 297 (at a side opposite to the head substrate 293).

As described above, the light shielding member 297 provided with the light guide holes 2971 for the respective light emitting element groups 295 is arranged between the light emitting element groups 295 and the lens arrays 299 in the light beam propagation direction Doa. Accordingly, light beams emitted from the light emitting element groups 295 propagate toward the lens arrays 299 through the light guide holes 2971 corresponding to the light emitting element groups 295. Conversely speaking, out of the light beams emitted from the light emitting element groups 295, those propagating toward other than the light guide holes 2971 corresponding to the light emitting element groups 295 are shielded by the light shielding member 297. In this way, all the lights emitted from one light emitting element group 295 propagate toward the lens arrays 299 via the same light guide hole 2971 and the mutual interference of the light beams emitted from different light emitting element groups 295 is prevented by the light shielding member 297.

Figure 9:
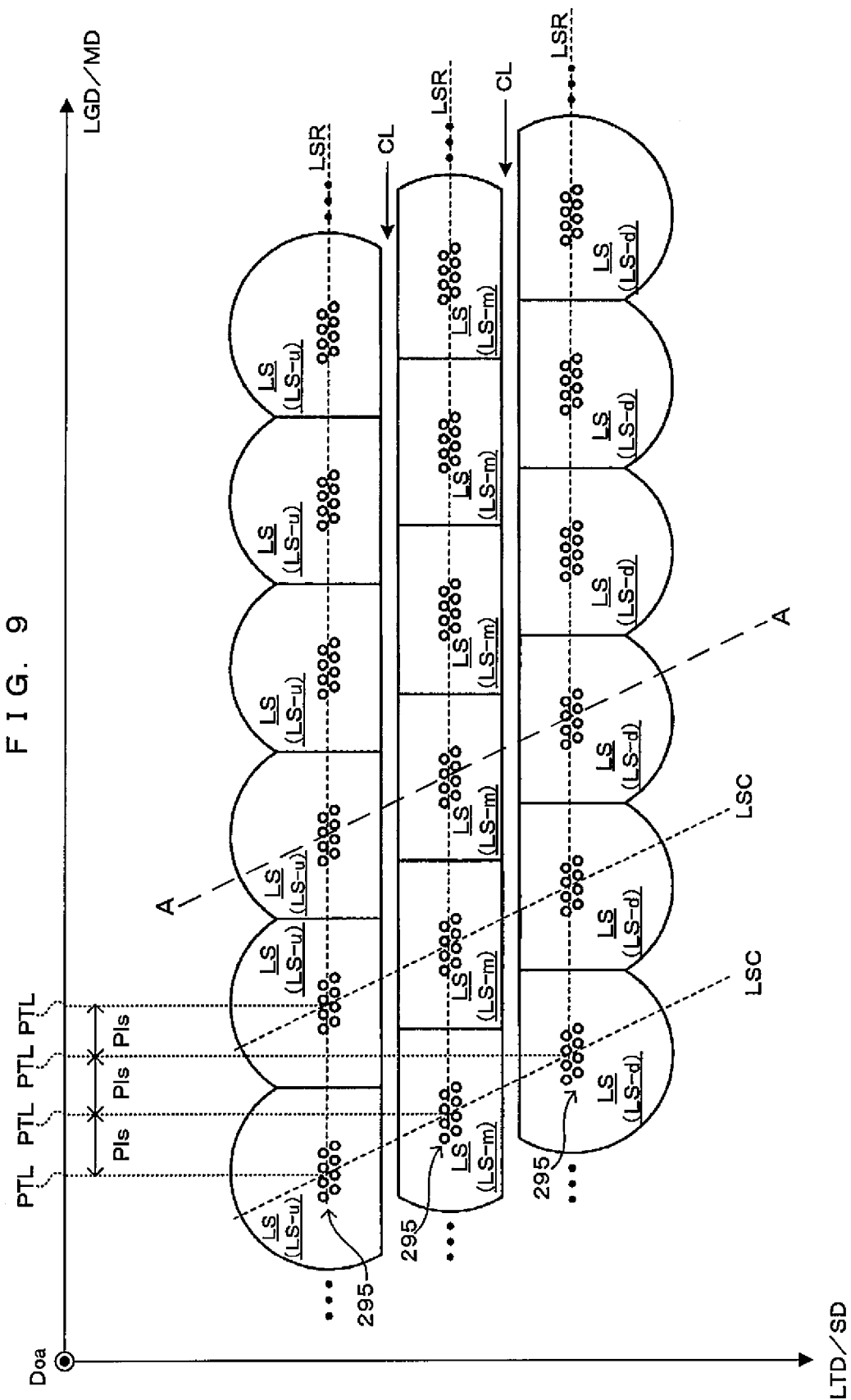
FIG. 9 is a plan view of the lens array according to the first embodiment.

FIG. 9 is a plan view of the lens array according to the first embodiment and corresponds to a case where the lens array is viewed from the image plane side (that is, from the light beam propagation direction Doa). In FIG. 9, the respective lenses LS are provided on the under surface 2991-t of the lens array substrate 2991. The structure of the under surface 2991-t of the lens array substrate is shown in FIG. 9. In addition, while FIG. 9 shows light emitting element groups 295, this is merely to show how the light emitting element groups 295 correspond to the lenses LS without any intention to mean that the light emitting element groups 295 are provided on the under surface 2991-t of the lens array substrate. In the lens array 299, the lenses LS are provided for each light emitting element group 295. That is, three lenses LS are provided at different positions in the width direction LTD, thereby forming the lens columns LSC, and the plurality of lens columns LSC are arranged in the longitudinal direction LGD. In each lens column LSC, three lenses are arranged at positions which are shifted by the lens pitches Pls in the longitudinal direction LGD. As a result, the positions PTL of the respective lenses LS in the longitudinal direction LGD are different from each other.

In other words, in the lens array 299, the plurality of lenses LS are arranged in the longitudinal direction LGD to form the lens rows LSR, and three lens rows LSR are arranged in the width direction LTD. Further, the respective lens rows LSR are displaced from each other by the lens pitches Pls in the longitudinal direction LGD. Hence, the positions PTL of the respective lenses LS in the longitudinal direction LGD are different from each other. The plurality of lenses LS are thus two-dimensionally arranged in the lens array 299. In FIG. 9, the positions of the lenses LS are represented by the apices (that is, the points at which the sag is maximum) of the lenses LS, and the positions PTL of the lenses LS in the longitudinal direction LGD are denoted at feet of perpendiculars to an axis of the longitudinal direction LGD from the apices of the lenses LS.

In this embodiment, the lenses LS which are adjacent to each other in the longitudinal direction LGD are connected with each other in each lens row LSR, as shown in FIG. 9. Meanwhile, in the width direction LTD, the lens rows LSR are arranged at intervals (clearances) CL and the lens rows LSR are spaced apart from each other.

Further, as shown in FIG. 9, the shapes of the lenses LS are different between different lens rows LSR. That is, the shapes of upstream lenses LS-u belonging to the upstream-most lens row LSR and downstream lenses LS-d belonging to the downstream-most lens row LSR in the width direction LTD are like rectangles joined to arcs. The shapes of middle lenses LS-m belonging to the middle lens row LSR in the width direction LTD are approximately rectangular. In the meantime, as shown in FIG. 5, the light guide holes 2971 have shapes which correspond to the associated lenses LS. That is, the shapes of the light guide holes 2971-u corresponding to the upstream lenses LS-u and the light guide holes 2971-d corresponding to the downstream lenses LS-d are like rectangles joined to arcs. The shapes of the light guide holes 2971-m corresponding to the middle lenses LS-m are approximately rectangular.

Figure 10:
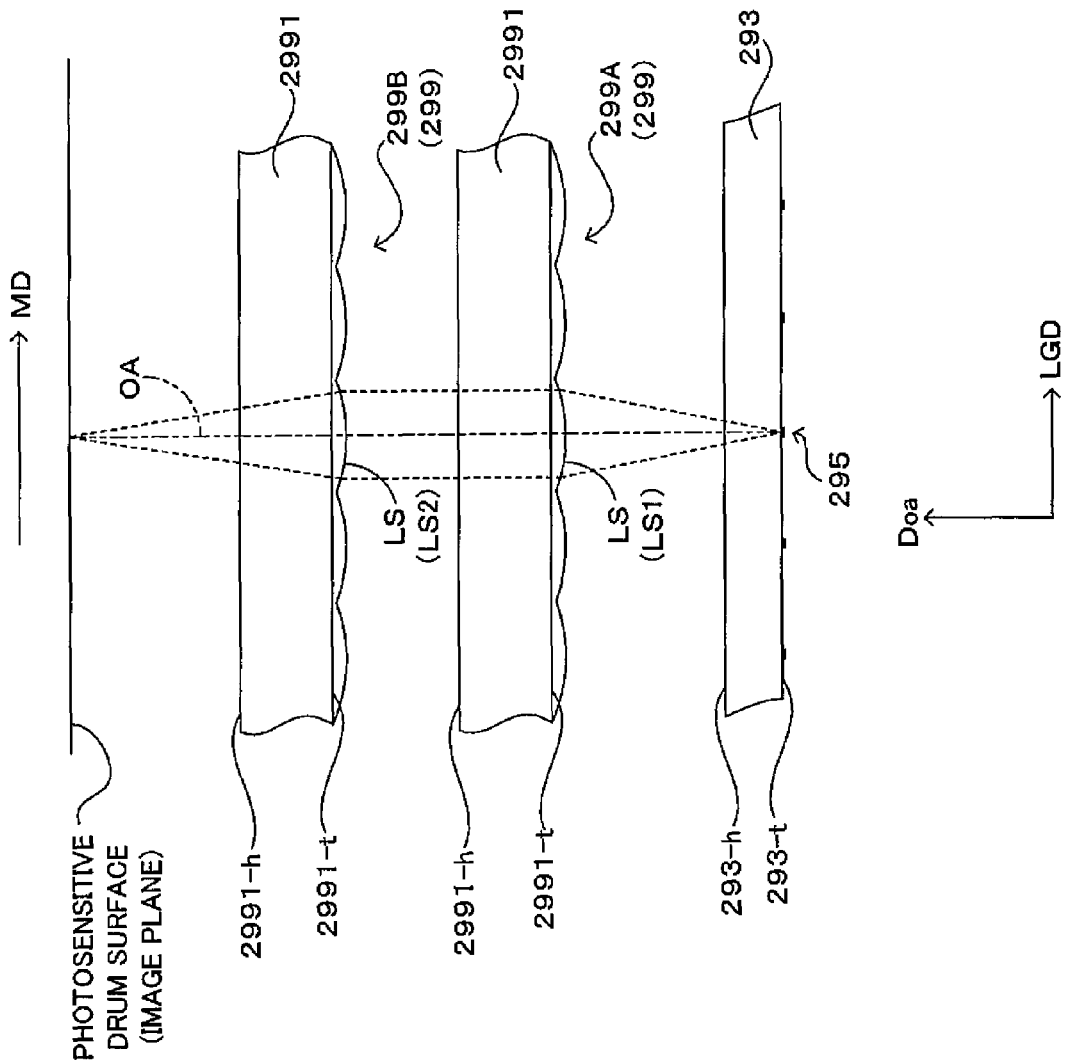
FIG. 10 is a cross sectional view of the lens array, the head substrate and the like taken along the longitudinal direction, showing a longitudinal-direction cross section including the optical axes of the lenses of the lens array.

FIG. 10 is a cross sectional view of the lens array, the head substrate and the like taken along the longitudinal direction, showing a longitudinal-direction cross section including the optical axes of the lenses LS of the lens array. The lens array 299 comprises the light transmissive lens array substrate 2991. In this embodiment, the lens array substrate 2991 is made of glass whose coefficient of linear expansion is relatively small. Of the top surface 2991-h and the under surface 2991-t of the lens array substrate 2991, the lenses LS are formed on the under surface 2991-t of the lens array substrate 2991. This lens array 299 is obtained by the method according to JP-A-2005-276849 for instance or otherwise appropriate methods. In other words, a mold which have concave sections corresponding to the shapes of the lenses LS are brought into contact with the glass substrate as the lens array substrate 2991. The space between the mold and the light transmissive substrate is then filled with a light curing resin. As the light curing resin is irradiated with light, the light curing resin hardens and the lenses LS are formed on the light transmissive substrate. The mold is released once the light curing resin has hardened and the lenses LS have been formed. According to this embodiment, the lenses LS are formed with a light curing resin which quickly hardens under irradiation of light. Therefore, it is possible to form the lenses LS in a simple manner. Hence, it is possible to simplify the step of forming the lens array 299 and to reduce the cost of the lens array 299. Further, since the lens array substrate 2991 is made of glass whose coefficient of linear expansion is small, deformation of the lens array 299 due to a temperature change is suppressed, which makes it possible to realize excellent exposure independently of the temperature.

In this line head 29, two lens arrays 299 (299A, 299B) having such a configuration are arranged side by side in the light beam propagation direction Doa, so that two lenses LS1, LS2 aligned in the light propagation direction Doa are arranged for each light emitting element group 295 (FIGS. 5, 6 and 10). An optical axis OA (chain double-dashed line in FIG. 10) passing the centers of the first and second lenses LS1, LS2 corresponding to the same light emitting element group 295 is orthogonal to or substantially orthogonal to the under surface 293-t of the head substrate 293. Here, the lens LS of the line head 299A upstream in the light beam propagation direction Doa is the first lens LS1, and that of the line head 299B downstream in the light beam propagation direction Doa is the second lens LS2. In this way, since a plurality of lens arrays 299 are arranged side by side in the light beam propagation direction Doa in this embodiment, a degree of freedom in optical design can be increased.

As described above, the line head 29 is provided with an imaging optical system including the first and the second lenses LS1, LS2. Accordingly, light beams emitted from the light emitting element groups 295 are imaged by the first and the second lenses LS1, LS2 to form spots SP on the photosensitive drum surface (image plane). On the other hand, the photosensitive drum surface is charged by the charger 23 prior to spot formation as described above. Thus, areas where the spots SP are formed are neutralized to form spot latent images Lsp. The spot latent images Lsp thus formed are conveyed toward a downstream side in the sub scanning direction SD while being carried on the photosensitive drum surface. As described next, the spots SP are formed at timings in conformity with the movement of the photosensitive drum surface to form a plurality of spot latent images Lsp aligned in the main scanning direction MD.

Figure 11:
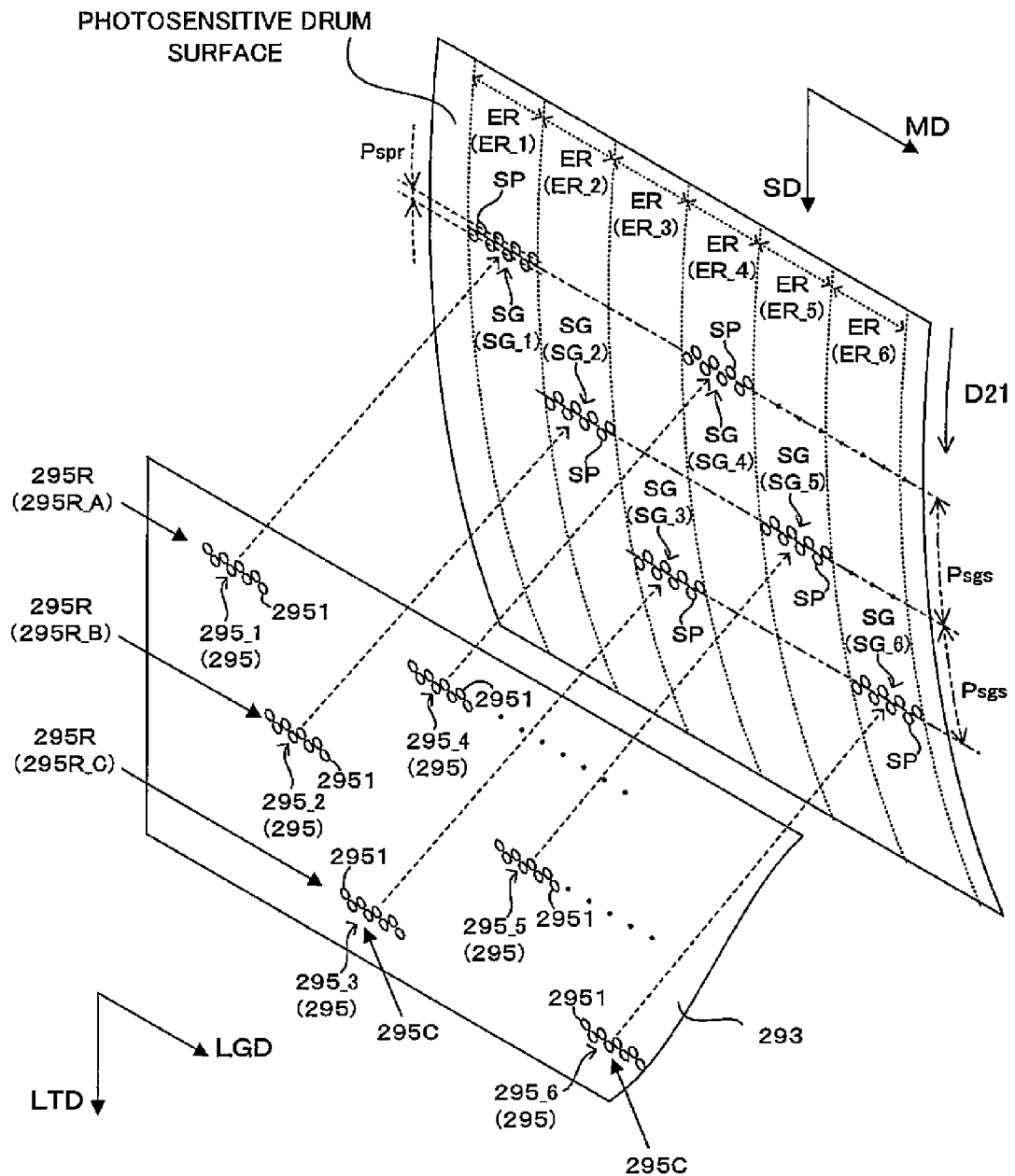
FIG. 11 is a perspective view showing spots formed by the line head.

FIG. 11 is a perspective view showing spots formed by the line head. The lens array 299 is not shown in FIG. 11. As shown in FIG. 11, the respective light emitting element groups 295 can form the spot groups SG in exposure regions ER mutually different in the main scanning direction MD. Here, the spot group SG is a set of a plurality of spots SP formed by the simultaneous light emissions of all the light emitting elements 2951 of the light emitting element group 295. As shown in FIG. 11, three light emitting element groups 295 capable of forming the spot groups SG in the exposure regions ER consecutive in the main scanning direction M are displaced from each other in the width direction LTD. In other words, three light emitting element groups 295_1, 295_2 and 295_3 capable of forming spot groups SG_1, SG_2 and SG_3, for example, in exposure regions ER_1, ER_2 and ER_3 consecutive in the main scanning direction MD are displaced from each other in the width direction LTD. These three light emitting element groups 295 constitute the light emitting element group column 295C, and a plurality of light emitting element group columns 295C are arranged in the longitudinal direction LGD. As a result, three light emitting element group rows 295R_A, 295R_B and 295R_C are arranged in the width direction LTD and the respective light emitting element group rows 295R_A, etc. form the spot groups SG at positions mutually different in the sub scanning direction SD as already described in the description of FIG. 7.

Specifically, in this line head 29, the plurality of light emitting element groups 295 (for example, light emitting element groups 295_1, 295_2, 295_3) are arranged at positions mutually different in the width direction LTD. The respective light emitting element groups 295 arranged at the positions mutually different in the width direction LTD form spot groups SG (for example, spot groups SG_1, SG_2, SG_3) at positions mutually different in the sub scanning direction SD.

In other words, in this line head 29, the plurality of light emitting elements 2951 are arranged at positions mutually different in the width direction LTD. For example, the light emitting elements 2951 belonging to the light emitting element group 295_1 and those belonging to the light emitting element group 295_2 are arranged at positions mutually different in the width direction LTD. The respective light emitting elements 2951 arranged at the positions mutually different in the width direction LTD form spots SP at positions mutually different in the sub scanning direction SD. For example, spots SP belonging to the spot group SG_1 and those belonging to the spot group SG_2 are formed at positions mutually different in the sub scanning direction SD.

In this way, the formation positions of the spots SP in the sub scanning direction SD differ depending on the light emitting elements 2951. Accordingly, in order to form a plurality of spot latent images Lsp side by side in the main scanning direction MD (that is, in order to form a plurality of spot latent images Lsp side by side at the same position in the sub scanning direction SD), differences in such spot formation positions need to be considered. Thus, in this line head 29, the respective light emitting elements 2951 are driven at timings in conformity with the movement of the photosensitive drum surface.

Figure 12:
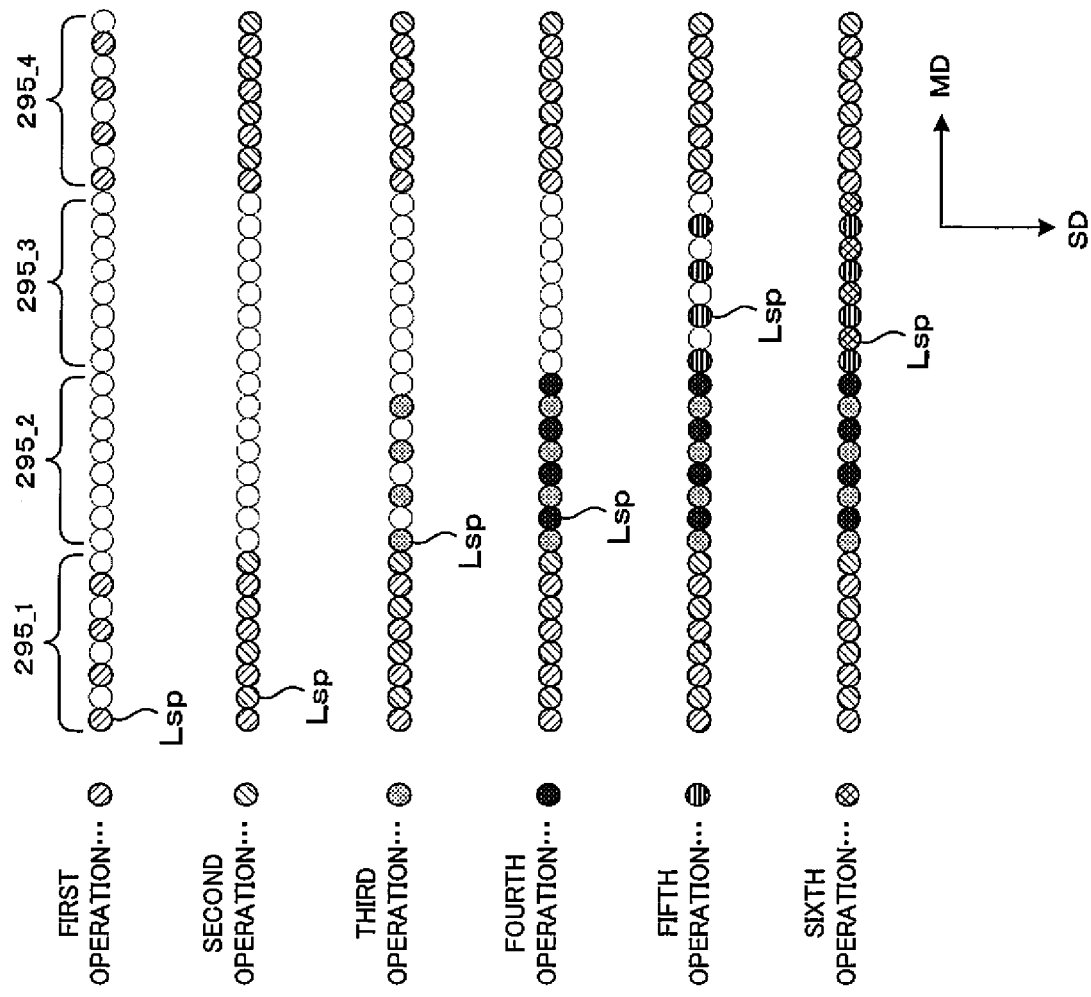
FIG. 12 is a diagram showing a spot forming operation by the above line head.

FIG. 12 is a diagram showing a spot forming operation by the above line head. The spot forming operation by the line head is described with reference to FIGS. 7, 11 and 12. Briefly, the photosensitive drum surface (latent image carrier surface) is moved in the sub scanning direction SD and the head control module 54 (FIG. 4) drives the light emitting elements 2951 for light emission at timings in conformity with the movement of the photosensitive drum surface, whereby a plurality of spot latent images Lsp arranged in the main scanning direction MD are formed.

First of all, out of the light emitting element rows 2951R (FIG. 11) belonging to the most upstream light emitting element groups 295_1, 295_4, and the like in the width direction LTD, the light emitting element rows 2951R downstream in the width direction LTD are driven for light emission. A plurality of light beams emitted by such a light emitting operation are imaged by the lenses LS to form spots SP on the photosensitive drum surface. The lenses LS have an inversion characteristic, so that the light beams from the light emitting elements 2951 are imaged in an inverted manner. In this way, spot latent images Lsp are formed at hatched positions of a "First Operation" of FIG. 12. In FIG. 12, white circles represent spots that are not formed yet, but planned to be formed later. In FIG. 12, spots labeled by reference numerals 295_1 to 295_4 are those to be formed by the light emitting element groups 295 corresponding to the respective attached reference numerals.

Subsequently, out of the light emitting element rows 2951R belonging to the most upstream light emitting element groups 295_1, 295_4, and the like in the width direction, the light emitting element rows 2951R upstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Second Operation" of FIG. 12. Here, the light emitting element rows 2951R are successively driven for light emission from the one downstream in the width direction LTD in order to deal with the inversion characteristic of the lenses LS.

Subsequently, out of the light emitting element rows 2951R belonging to the second most upstream light emitting element groups 295_2 and the like in the width direction, the light emitting element rows 2951R downstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Third Operation" of FIG. 12.

Subsequently, out of the light emitting element rows 2951R belonging to the second most upstream light emitting element groups 295_2 and the like in the width direction, the light emitting element rows 2951R upstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Fourth Operation" of FIG. 12.

Subsequently, out of the light emitting element rows 2951R belonging to the third most upstream light emitting element groups 295_3 and the like in the width direction, the light emitting element rows 2951R downstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Fifth Operation" of FIG. 12.

Finally, out of the light emitting element rows 2951R belonging to the third most upstream light emitting element groups 295_3 and the like in the width direction, the light emitting element rows 2951R upstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Sixth Operation" of FIG. 12. By performing the first to sixth light emitting operations in this way, a plurality of spots SP are successively formed from the upstream ones in the sub scanning direction SD to form a plurality of spot latent images Lsp aligned in the main scanning direction MD.

As described above, in the first embodiment, the plurality of lenses LS are provided on the lens array substrate 2991 which is light transmissive. This lens array substrate 2991 is provided with the lens rows LSR in which the plurality of lenses LS are arranged in the longitudinal direction LGD (first direction). In the lens rows LSR, the lenses LS which are adjacent to each other in the longitudinal direction LGD are connected with each other. In other words, according to the first embodiment, there are no gaps between the lenses LS which are adjacent to each other in the longitudinal direction LGD unlike where the related techniques are used, and these adjacent lenses LS are connected to each other. It is therefore possible to guide a large amount of light into the lenses even at a high resolution and to realize excellent exposure.

By the way, the embodiment described above uses organic EL elements as the light emitting elements 2951, and since these organic EL elements emit less light than LEDs (light emitting diodes), the amount of light which the lenses LS can receive tends to decrease. The amount of light which can reach the lenses LS further decreases particularly when organic EL elements of the bottom emission type are used since the head substrate 293 absorbs some of light beams emitted from the organic EL elements. On the contrary, in the embodiment described above, since the lenses LS which are adjacent to each other in the longitudinal direction LGD are connected with each other, it is possible to guide a large amount of light into the lenses LS. Hence, even where organic EL elements of the bottom emission type are used as the light emitting elements 2951, it is possible to expose in a favorable way.

B-2. SECOND EMBODIMENT

Figure 13:
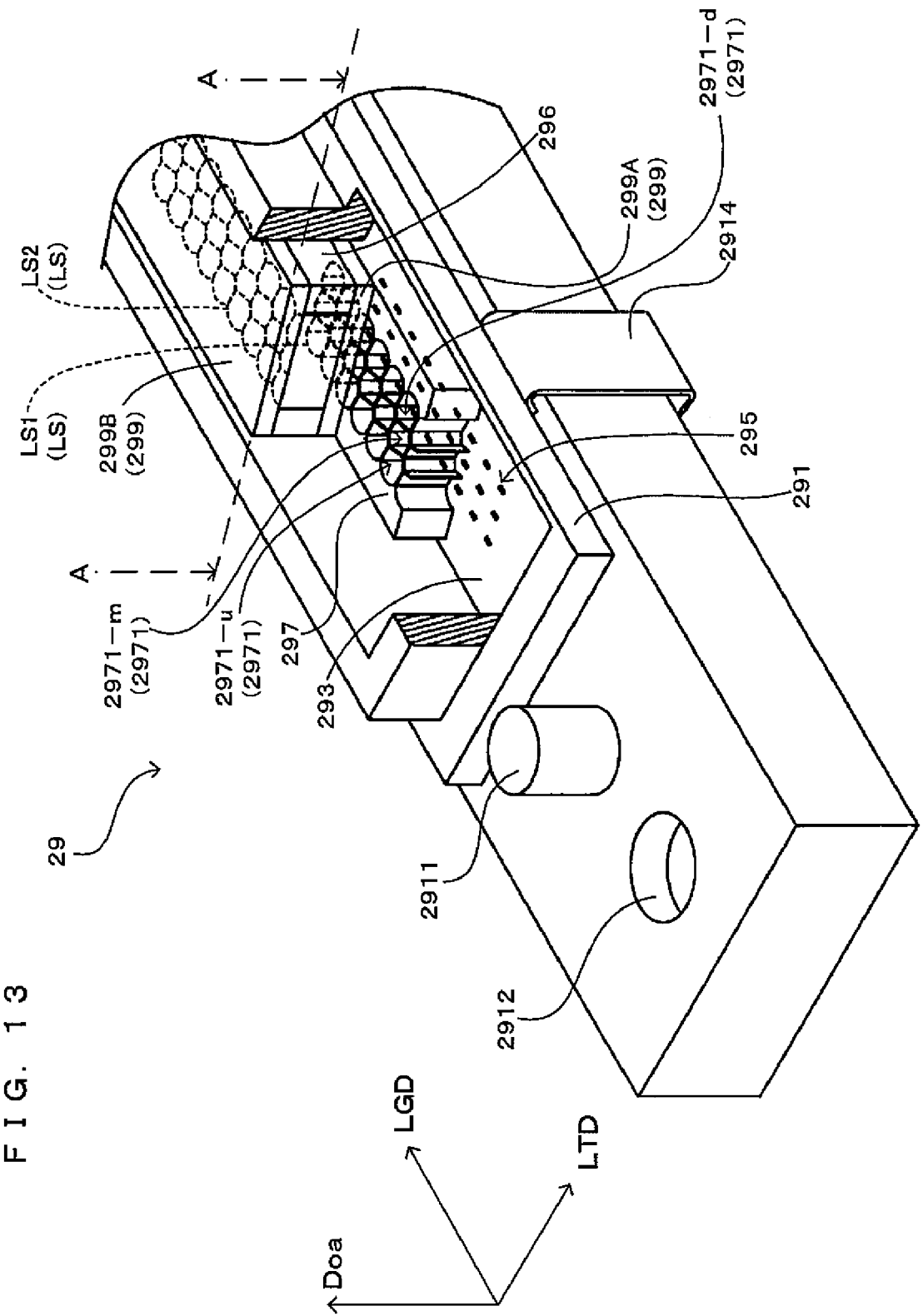
FIG. 13 is a schematic perspective view of a line head according to a second embodiment.
Figure 14:
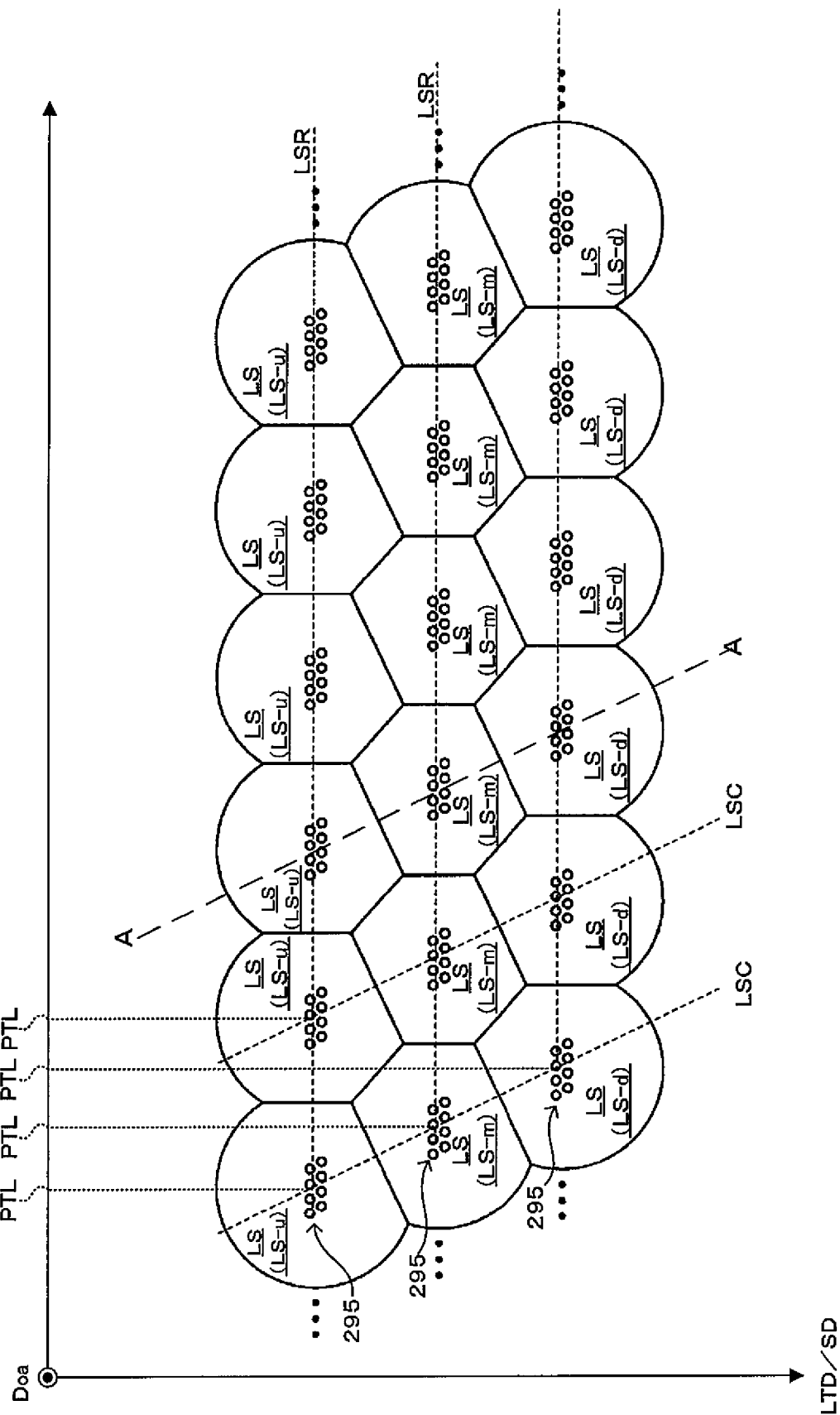
FIG. 14 is a plan view of a lens array according to the second embodiment.

FIG. 13 is a schematic perspective view of a line head according to a second embodiment. FIG. 14 is a plan view of a lens array according to the second embodiment and corresponds to a case where the lens array is seen from the image plane side (that is, from the light beam propagation direction Doa). In FIG. 14, the respective lenses LS are provided on the under surface 2991-$t$ of the lens array substrate 2991. The structure of the under surface 2991-$t$ of the lens array substrate is shown in FIG. 14. In addition, while FIG. 14 shows light emitting element groups 295, this is merely to show how the light emitting element groups 295 correspond to the lenses LS without any intention to mean that the light emitting element groups 295 are provided on the under surface 2991-$t$ of the lens array substrate. In the following, differences of the second embodiment from the first embodiment will be mainly described. Common aspects will be denoted at corresponding reference symbols but will not be described.

As shown in FIG. 14, in the second embodiment as well, the plurality of lenses LS are arranged in the longitudinal direction LGD to form the lens rows LSR, and three lens rows LSR are arranged in the width direction LTD. Further, the respective lens rows LSR are displaced from each other by the lens pitches Pls in the longitudinal direction LGD. Hence, the positions PTL of the respective lenses LS in the longitudinal direction LGD are different from each other. In each lens row LSR, the lenses LS which are adjacent to each other in the longitudinal direction LGD are connected with each other. However, in the second embodiment, the intervals CL like those according to the first embodiment are not provided between the lens rows. Instead, the lenses LS which are adjacent to each other in the width direction LTD are connected with each other.

In addition, in the second embodiment as well, the shapes of the lenses LS are different between different lens rows LSR as shown in FIG. 14. That is, the shapes of upstream lenses LS-u belonging to the upstream-most lens row LSR and downstream lenses LS-d belonging to the downstream-most lens row LSR in the width direction LTD are like pentagons (which are like home plates) joined to arcs. The shapes of middle lenses LS-m belonging to the middle lens row LSR in the width direction LTD are approximately hexagonal. In the meantime, as shown in FIG. 13, the light guide holes 2971 have shapes which correspond to the associated lenses LS. That is, the shapes of the light guide holes 2971-$u$ corresponding to the upstream lenses LS-u and the light guide holes 2971-$d$ corresponding to the downstream lenses LS-d are like home plate-like pentagons joined to arcs. The shapes of the light guide holes 2971-$m$ corresponding to the middle lenses LS-m are approximately hexagonal.

In the second embodiment as well, the lenses LS which are adjacent to each other in the longitudinal direction LGD (first direction) are connected with each other. In other words, there are no gaps between the adjacent lenses LS in the longitudinal direction LGD unlike where the related techniques are used, and these adjacent lenses LS are connected to each other. It is therefore possible to guide a large amount of light into the lenses even at a high resolution and to realize excellent exposure.

Further, according to the second embodiment, in the lens array substrate 2991, the plurality of lens rows LSR are arranged in the width direction LTD (second direction) and the lenses LS of the lens rows LSR which are adjacent to each other in the width direction LTD are connected with each other. That is, the lenses LS are connected with each other not only in the longitudinal direction LGD but in the width direction LTD as well according to the second embodiment. Hence, it is possible to make an even larger amount of light impinge upon the lenses LS and to realize excellent exposure.

B-3. THIRD EMBODIMENT

By the way, in the structure shown in FIG. 14, the lenses LS-u (a first lens and a second lens) are connected with the lenses LS-m (a third lens) so that it is possible for the lenses to receive a large amount of light without widening the gaps between the lenses LS-u and the lenses LS-m. Further, the lenses LS-m (a first lens and a second lens) are connected with the lenses LS-d (a third lens) so that it is possible for the lenses to receive a large amount of light without widening the gaps between the lenses LS-m and the lenses LS-d. In other words, the structure shown in FIG. 14 is capable of reducing the width of the lens array 299 in the width direction LTD (second direction). As a result, it is also possible to reduce in the width direction LTD the area on the head substrate 293 where the light emitting elements 2951 corresponding to the respective lenses LS are arranged. It is therefore possible to secure extra spaces at the both sides of the head substrate 293 on which the light emitting elements 2951 are arranged in the width direction LTD. Consequently, drive circuits for driving the light emitting elements can be arranged in the extra spaces. A specific way to implement this is as described below.

Figure 15:
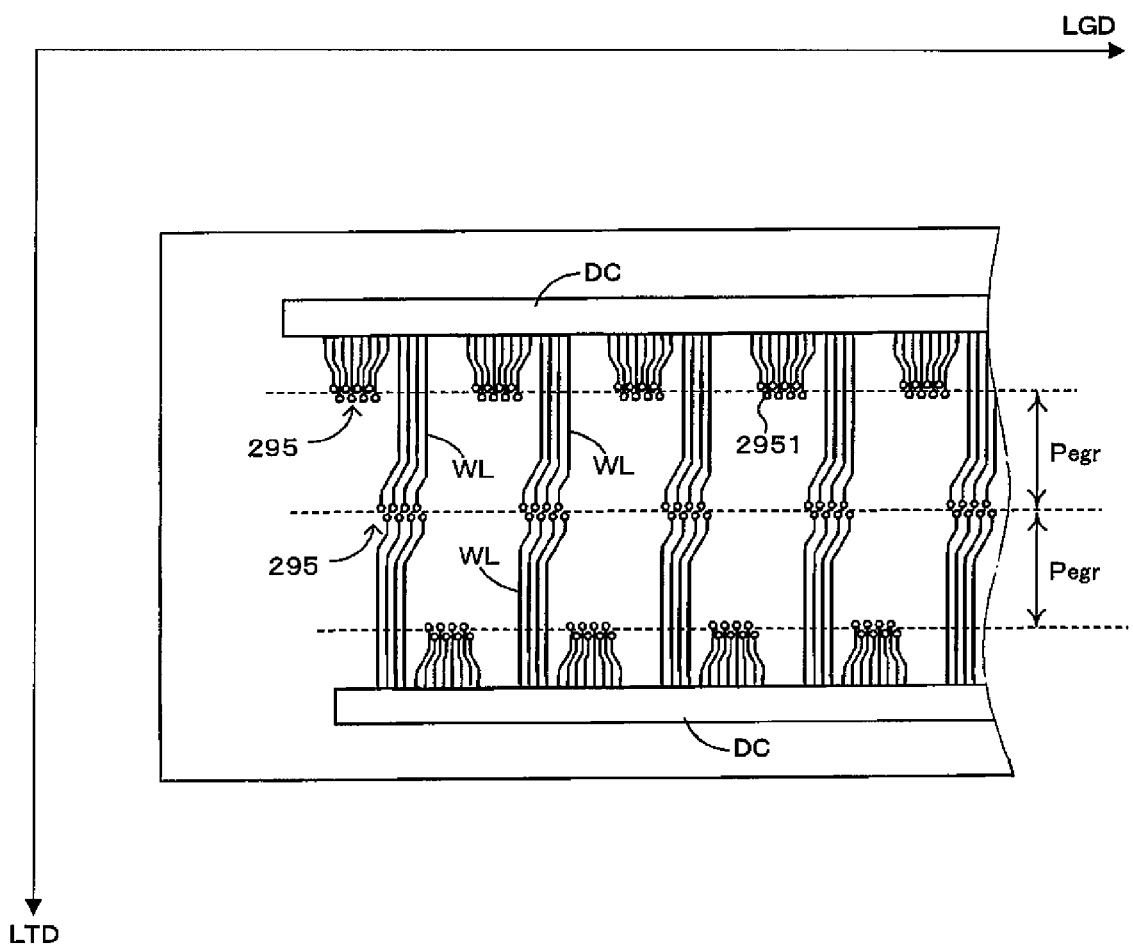
FIG. 15 is a plan view showing the structure of the head substrate according to the third embodiment.

FIG. 15 is a plan view showing the structure of the head substrate according to the third embodiment. As shown in FIG. 15, drive circuits DC formed by TFTs are arranged in vacant spaces at the both sides of the head substrate 293 in the width direction LTD. The drive circuits DC are connected with the light emitting elements 2951 by interconnection lines WL and feed a drive signal to the light emitting elements 2951. Thus arranged in the vacant spaces at the both sides of the head substrate 293 in the width direction LTD, the drive circuits DC can be located relatively close to the light emitting elements 2951. Hence, it is possible to shorten the interconnection lines WL, which makes it possible to provide the light emitting elements 2951 with a drive signal which is less dampening induced by a floating capacitance of the interconnection lines WL and to perform an excellent exposure operation.

B-4. FOURTH EMBODIMENT

Figure 16:
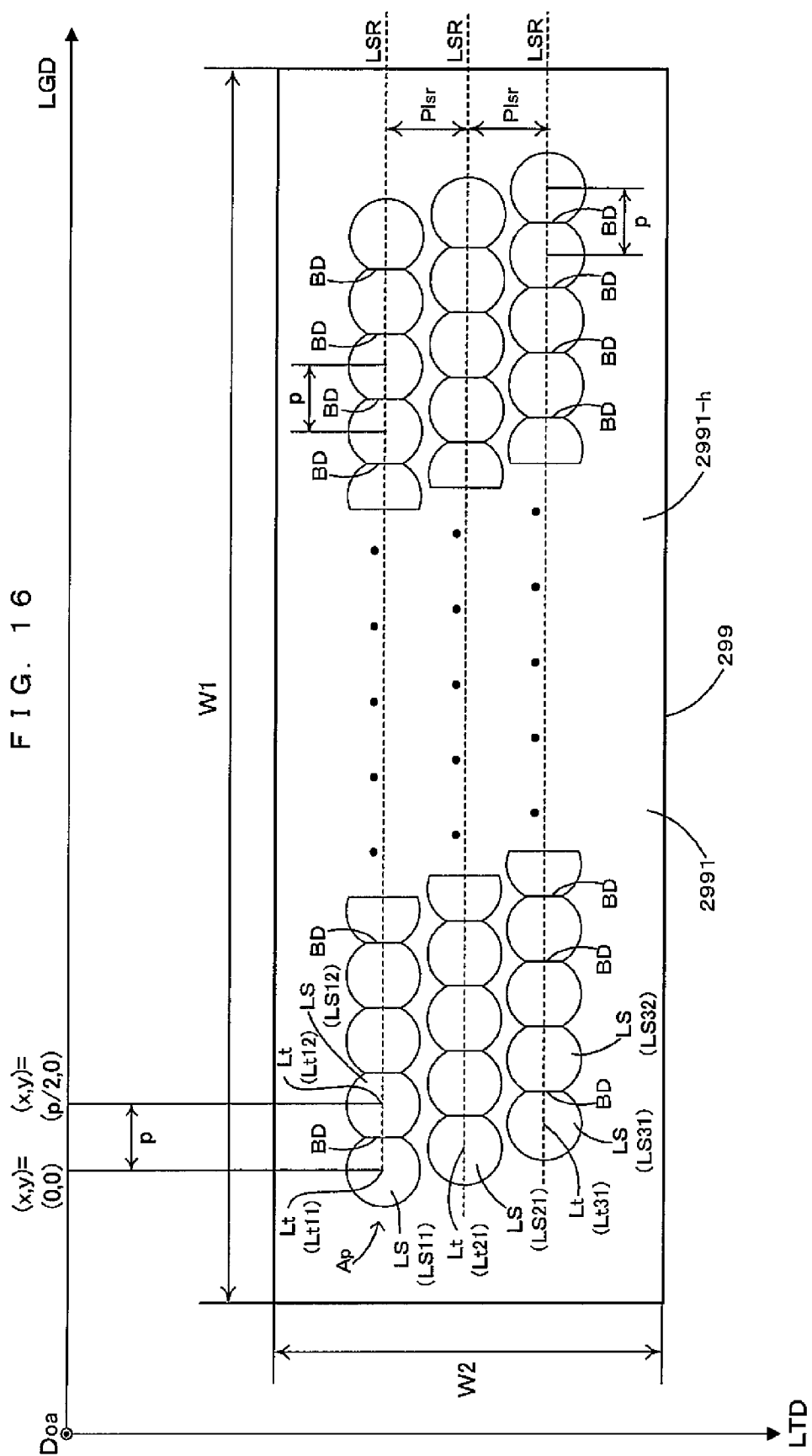
FIG. 16 is a plan view of a lens array according to a fourth embodiment.

FIG. 16 is a plan view of a lens array according to a fourth embodiment. This lens array 299 comprises the lens array substrate 2991 (light transmissive substrate) whose base material is glass. The lens array substrate 2991 has a length W1 in the longitudinal direction LGD and a width W2 (a length W2) in the width direction LTD. The length W1 is greater than the width W2, and hence, the lens array substrate 2991 is long in the longitudinal direction LGD. The plurality of lenses LS are two-dimensionally arranged on the top surface 2991-h of the lens array substrate 2991. In each lens row LSR, the lenses LS which are adjacent to each other at intervals p in the longitudinal direction LGD are connected with each other in the longitudinal direction LGD. In FIG. 16, of the top surface 2991-h of the lens array substrate, a flat area on which the lenses LS are not formed is shown as a flat area Ap (first area).

Further, in FIG. 16, for indicating a location on the top surface 2991-h of the lens array substrate, x-y coordinates (x, y) are shown. The x-axis is a coordinate axis which is parallel to or approximately parallel to the longitudinal direction LGD, the y-axis is a coordinate axis which is parallel to or approximately parallel to the width direction LTD, and the x-axis and the y-axis are orthogonal to each other. The point of origin of this x-y coordinate system is the apex Lt11 of the top left lens LS11 in FIG. 16 (or a projected position of this apex upon the x-y plane). The apex Lt of each lens LS is a position at which the height of the lens LS from the flat area Ap is maximum. Thus, a point x is indicative of a position in the longitudinal direction LGD measured from the point of origin which is the apex Lt11, and a point y is indicative of a position in the width direction LTD measured from the point of origin which is the apex Lt11. The lens surface of each lens LS has the following structure.

Figure 17:
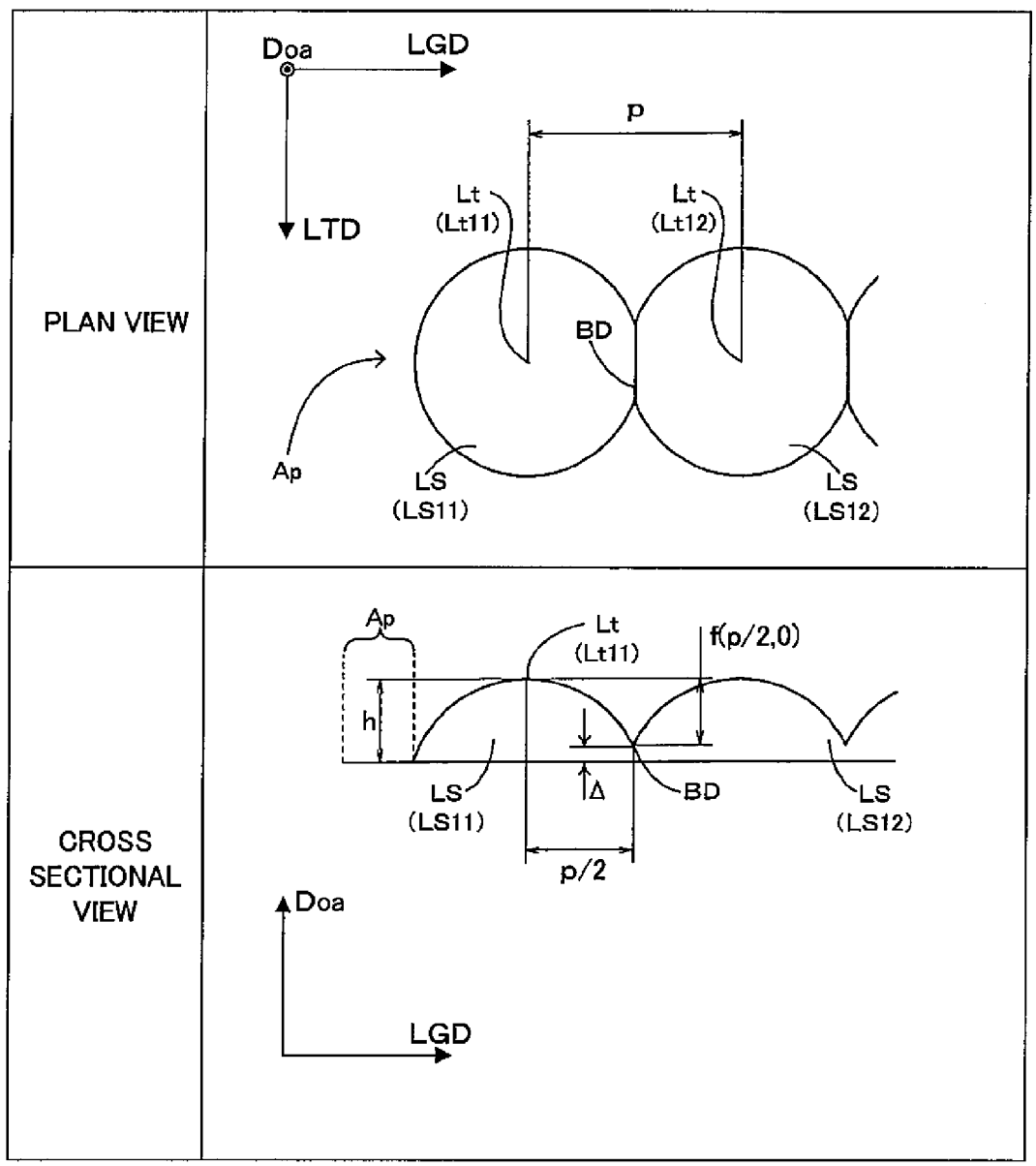
FIG. 17 is a group of views showing the structure of the lens surface of each lens.

FIG. 17 is a group of views showing the structure of the lens surface of each lens. The "PLAN VIEW" section in FIG. 17 corresponds to a plan view of the lens viewed from the light beam propagation direction Doa and the "CROSS SECTIONAL VIEW" section in FIG. 17 corresponds to a cross section of the lens in the longitudinal direction LGD including the apex Lt of the lens LS. In FIG. 17, a lens LS11 and a lens LS12 are shown as representative lenses in order to illustrate the relationship between two lenses LS which are adjacent to each other in the longitudinal direction LGD. In the following, the lens LS11 will be referred to as "the first lens" and the lens LS12 will be referred to as "the second lens" where needed.

The symbol h appearing in the "CROSS SECTIONAL VIEW" section in FIG. 17 is indicative of the height from the flat area Ap of a position (apex Lt) whose height from the flat area Ap is maximum within the lens surface of each lens LS. That is, the symbol h denotes the height from the flat area Ap (in other words, the top surface 2991-h of the lens array substrate) of the apex Lt of each lens LS, and the lenses LS are at the same height h. A function f(x, y) is indicative of the height of a coordinate (x, y) from the lens surface to the apex Lt (first position) of the lens LS. In this embodiment, the relationship below is satisfied:

$$f(p/2, 0) < h$$

That is, the first lens LS11 and the second lens LS12 are connected with each other in the longitudinal direction LGD, and the boundary BD between the first lens LS11 and the second lens LS12 is at a height $\Delta$ (=h−f(p/2, 0)>0) from the flat area Ap.

As described above, in this embodiment as well, the lenses LS which are adjacent to each other in the longitudinal direction LGD are connected with each other. It is therefore possible to make a large amount of light impinge upon the lenses LS without widening the intervals p between the lenses LS. This will now be described in detail.

Figure 18:
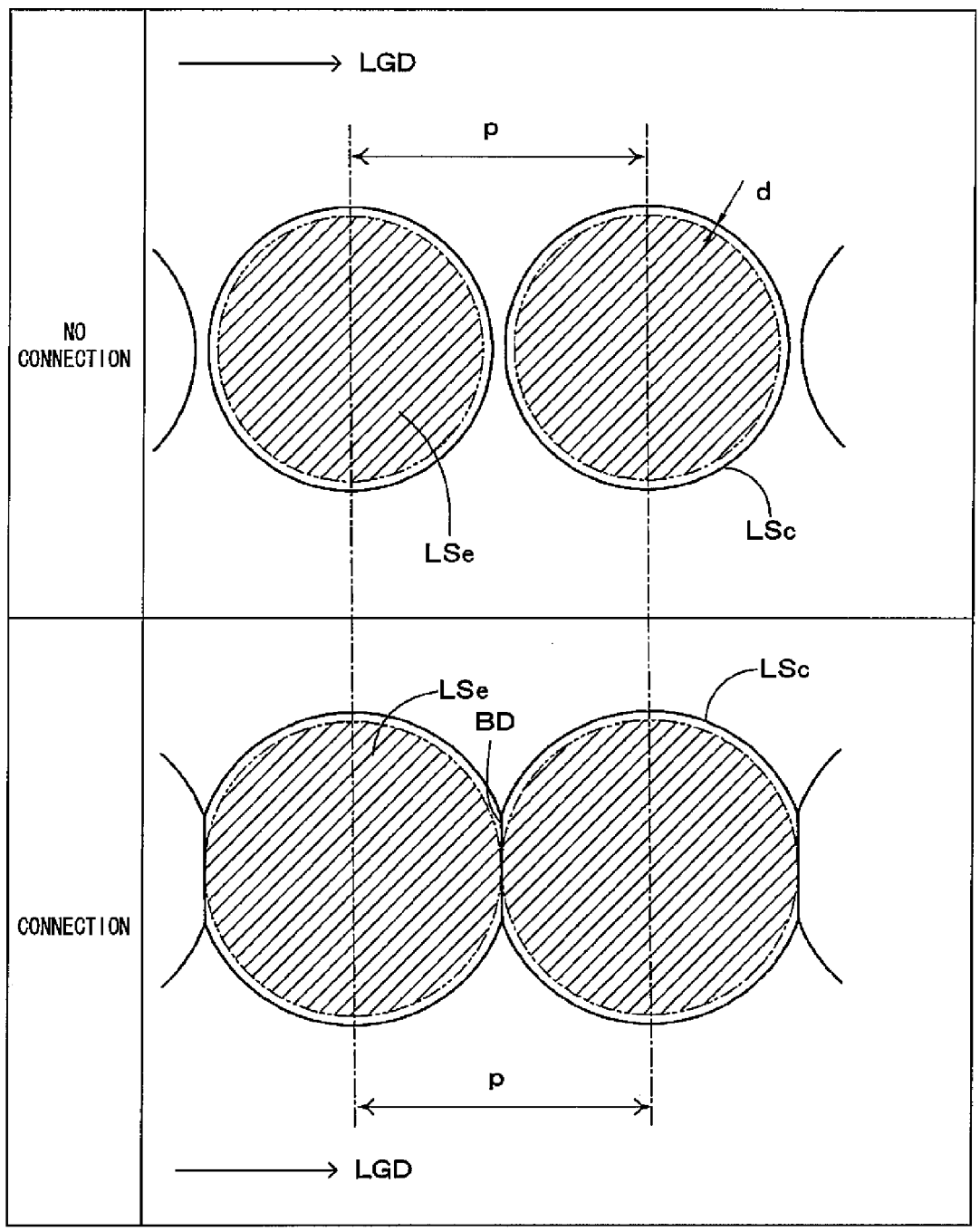
FIG. 18 is an explanatory view for describing the effect of the invention.

FIG. 18 is an explanatory view for describing the effect of the invention. The "NO CONNECTION" section in FIG. 18 corresponds to a case where the lenses LS which are adjacent to each other in the longitudinal direction LGD are not connected with each other, whereas the "CONNECTION" section in FIG. 18 corresponds to a case where these lenses LS are connected with each other in the longitudinal direction LGD (that is, a case where the invention is applied). In FIG. 18, the areas contained in the circles of the chain double-dashed line denote the effective areas LSe of the lenses LS and the circles of the solid lines denote the outer circumferences LSc of the lenses LS. In general, it is not possible to guarantee the surface accuracy of a lens surface which is in the vicinity of the outer circumference LSc of a lens. Consequently, it is necessary to provide a margin d between the outer circumference LSc of the lens and the effective area LSe of the lens LS. Where adjacent lenses LS in the longitudinal direction LGD are not connected with each other as shown in the "NO CONNECTION" section, it is necessary to provide the margin d all along the outer circumferences LSc of the lenses. On the contrary, when adjacent lenses LS in the longitudinal direction LGD are connected with each other as shown in the "CONNECTION" section, it is not necessary to provide the margin d in the longitudinal direction LGD. In consequence, it is possible to expand the effective areas LSe of the lenses without changing the intervals p between the lenses.

Further, a structure as that according to this embodiment in which the boundaries BD between mutually connected lenses LS are at the height Δ has a further advantage as described below. That is, in the event that the lens array 299 is to be formed using the mold described earlier, a light curing resin which is the base material of the lenses LS is filled into between the mold and the lens array substrate 2991. In order to form the lenses LS whose surfaces have highly accurate figures at this stage, it is desirable that the light curing resin reaches almost all over the lens array substrate 2991, and to this end, it is important to ensure the light curing resin remains fluid. In this respect, according to this embodiment, since the boundaries BD are at the height Δ, sections of the mold corresponding to the boundaries BD as well are at a predetermined height. Therefore, these sections corresponding to the boundaries BD help fluidize the light curing resin. As a result, it is possible to form lenses LS whose figures are highly accurate.

Figure 19:
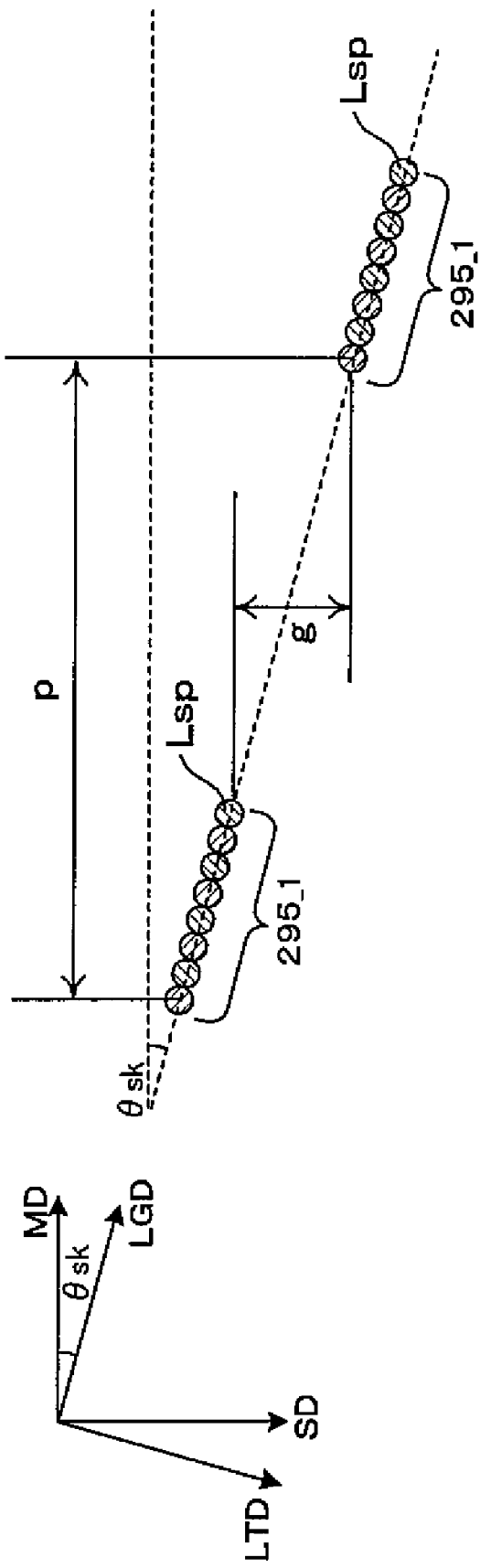
FIG. 19 is an explanatory view for describing further effect of the invention.

In addition, according to this embodiment, it is not necessary to widen the intervals p of the lenses LS. In other words, it is possible to reduce the lens intervals p. This embodiment attains the following effect in consequence. FIG. 19 is an explanatory view for describing further effect of the invention. As described above, the line head 29 is arranged such that the longitudinal direction LGD of the line head 29 is parallel to the axial direction (namely, the main scanning direction MD) of the photosensitive drum 21. However, the line head 29 is attached such that the longitudinal direction LGD of the line head 29 is skewed with respect to the main scanning direction M in some instances. When this occurs, a step g is created in the sub scanning direction SD between the plurality of spot latent images Lsp formed by the first lens LS11 and the plurality of spot latent images Lsp formed by the second lens LS12 as shown in FIG. 19. In FIG. 19, the spot latent images Lsp formed by the first lens LS11 are denoted at the reference symbol "295_1" and the spot latent images Lsp formed by the second lens LS12 are denoted at the reference symbol "295_4" in accordance with the reference symbols in FIG. 12. While the skew creates the step g in this manner, since the intervals p of the lenses LS are shortened according to this embodiment, it is possible to suppress the gap g to a relatively small value. As a result, it is possible to perform an excellent exposure operation despite the skew.

C. MISCELLANEOUS

As described above, in the above embodiments, the longitudinal direction LGD and the main scanning direction MD correspond to a "first direction" of the invention, the width direction LTD and the sub scanning direction SD to a "second direction" of the invention and the photosensitive drum 21 to a "latent image carrier" of the invention. Further, the line head 29 corresponds to an "exposure head" of the invention.

The invention is not limited to the above embodiments and various changes other than the above can be made without departing from the gist thereof. For instance, each light emitting element group 295 is formed by two light emitting element rows 2951R in the embodiments above. However, the number of the light emitting element rows 2951R which form each light emitting element group 295 is not limited to two but may be one for instance. Further, in the embodiments above, each light emitting element row 2951R is formed by four light emitting elements 2951. However, the number of the light emitting elements 2951 which form each light emitting element row 2951R is not limited to four. Hence, each light emitting element group 295 may be formed as described below.

Figure 20:
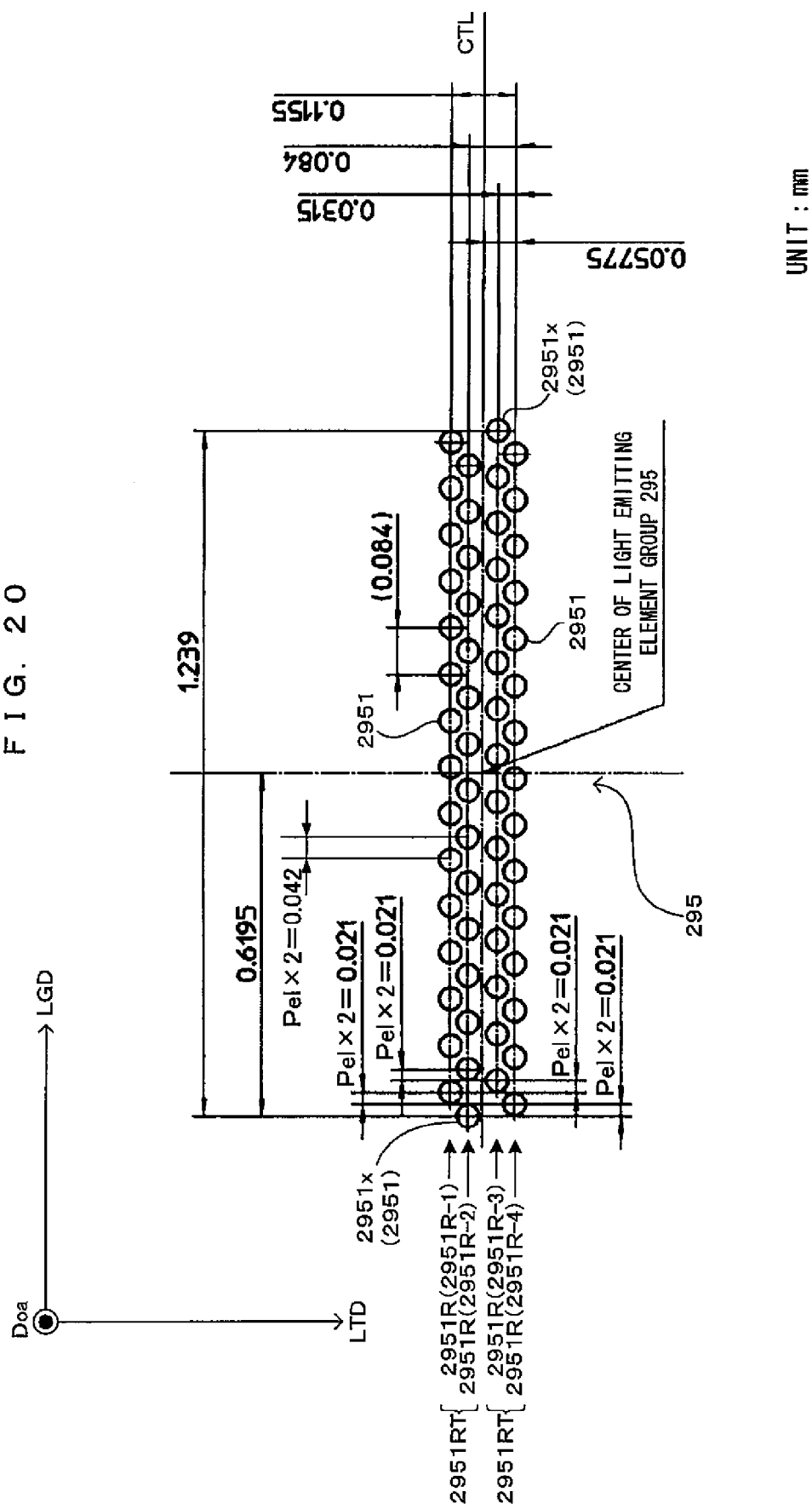
FIG. 20 is a plan view showing other structure of the light emitting element groups.
Figure 21:
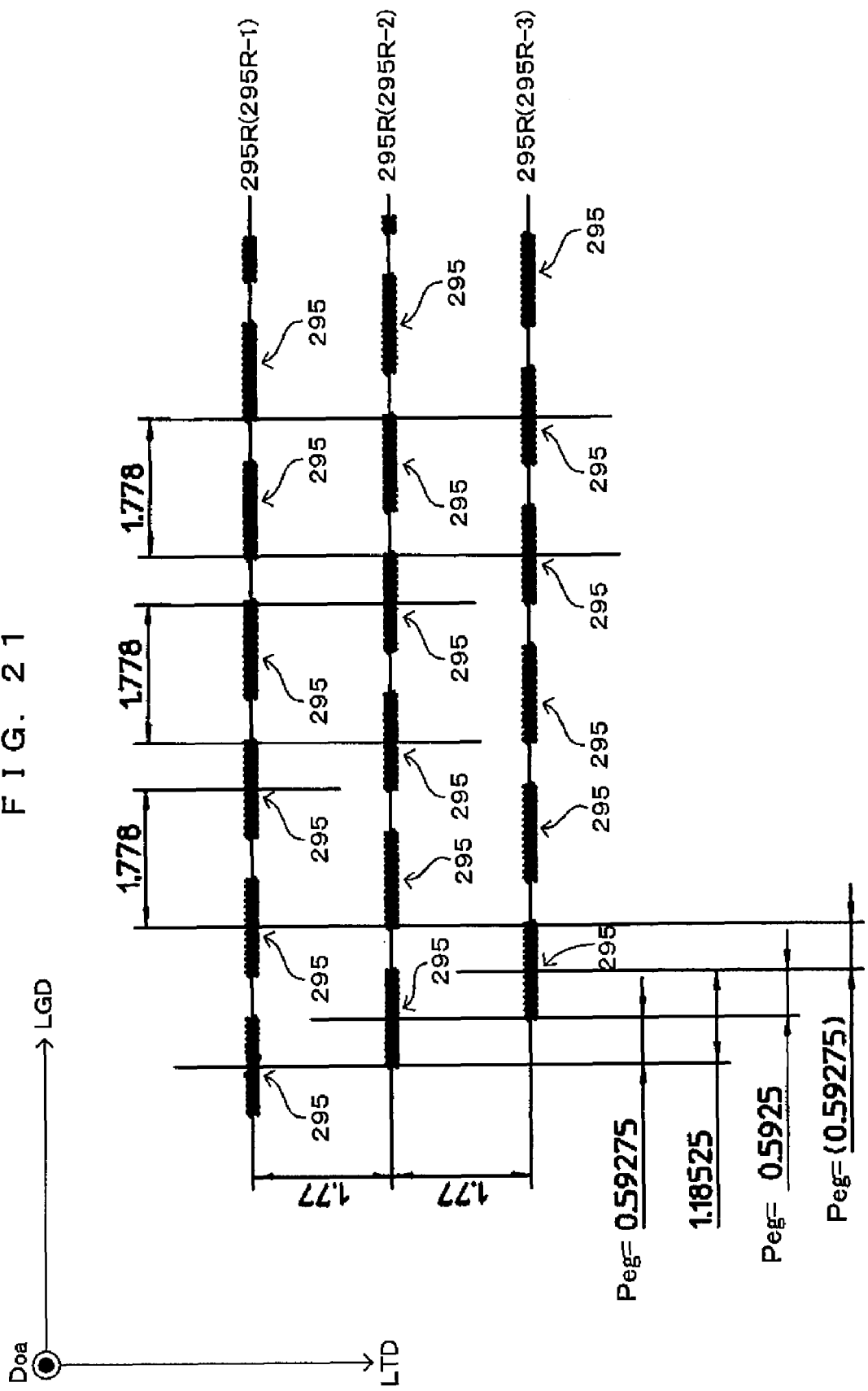
FIG. 21 is a view showing the structure of the under surface of the head substrate on which the plurality of light emitting element groups shown in FIG. 20 are arranged.

FIG. 20 is a plan view showing other structure of the light emitting element groups. FIG. 21 is a view showing the structure of the under surface of the head substrate on which the plurality of light emitting element groups shown in FIG. 20 are arranged and corresponds to a case where the under surface is viewed from the top surface of the head substrate. In the structure shown in FIG. 20, fifteen light emitting elements 2951 are arranged side by side in the longitudinal direction LGD to form the light emitting element rows 2951R. In the light emitting element rows 2951R, the light emitting elements 2951 are arranged at pitches (=0.084 [mm]) which are four times as large as the element pitches Pel (=0.021 [mm]). Four such light emitting element rows 2951R (2951R-1, 2951R-2, 2951R-3, 2951R-4) are arranged in the width direction LTD. In the width direction LTD, the pitch between the light emitting element row 2951R-4 and the light emitting element row 2951R-1 is 0.1155 [mm], the pitch between the light emitting element row 2951R-4 and the light emitting element row 2951R-2 is 0.084 [mm], and the pitch between the light emitting element row 2951R-4 and the light emitting element row 2951R-3 is 0.0315 [mm]. Further, when a straight line which is parallel to the longitudinal direction LGD and passes through the center (of gravity) of the light emitting element group 295 is a center line CTL, the pitch in the width direction LTD between the light emitting element row 2951R-1 and the center line CTL and that between the light emitting element row 2951R-4 and the center line CTL are 0.05775 [mm], respectively.

In FIG. 20, the two light emitting element rows 2951R-1 and 2951R-2 above the center line CTL constitute a light emitting element set 2951RT and the two light emitting element rows 2951R-3 and 2951R-4 below the center line CTL constitute a light emitting element set 2951RT. In each light emitting element set 2951RT, two light emitting element rows 2951R are shifted from each other in the longitudinal direction LGD by a pitch (=0.042 [mm]) which is twice as large as the element pitch Pel (=0.021 [mm]). Further, the two light emitting element sets 2951RT are shifted from each other in the longitudinal direction LGD by the element pitch Pel (=0.021 [mm]). Hence, the four light emitting element rows 2951R are shifted from each other in the longitudinal direction LGD by the element pitches Pel (=0.021 [mm]). As a result, the positions of the light emitting elements 2951 in the longitudinal direction LGD are different. When the light emitting elements 2951 at the both ends of the light emitting element groups 295 in the longitudinal direction LGD are called end light emitting elements 2951x, the pitch between the end light emitting elements 2951X in the longitudinal direction LGD is 1.239 [mm] and the pitch between the end light emitting element 2951x and the center of the light emitting element group 295 in the longitudinal direction LGD is 0.6195 [mm].

In the embodiment shown in FIG. 21, the light emitting element groups 295 shown in FIG. 20 are two-dimensionally arranged. As shown in FIG. 21, the plurality of light emitting element groups 295 are arranged in the longitudinal direction LGD to form the light emitting element group rows 295R. In the light emitting element group rows 295R, the light emitting element groups 295 are arranged at pitches (=1.778 [mm]) which are triple as large as the light emitting element group pitches Peg. Three light emitting element group rows 295R (295R-1, 295R-2, 295R-3) structured in this way are arranged in the width direction LTD at the light emitting element group row pitches Pegr (−1.77 [mm]). The light emitting element group rows 295R are shifted from each other in the longitudinal direction LGD by the light emitting element group pitches Peg (which are about 0.593 [mm]). That is, the light emitting element group row 295R-1 and the light emitting element group row 295R-2 are shifted from each other in the longitudinal direction LGD by 0.59275 [mm], the light emitting element group row 295R-2 and the light emitting element group row 295R-3 are shifted from each other in the longitudinal direction LGD by 0.5925 [mm], and the light emitting element group row 295R-3 and the light emitting element group row 295R-1 are shifted from each other in the longitudinal direction LGD by 0.59275 [mm]. Hence, the light emitting element group row 295R-1 and the light emitting element group row 295R-3 are shifted from each other in the longitudinal direction LGD by 1.18525 [mm].

Further, in the embodiments above, the lenses LS are formed on the under surface 2991-*t* of the lens array substrate to constitute the lens array 299. However, the structure of the lens array is not limited to this. That is, the lenses LS may be formed on the top surface 2991-*h* of the lens array substrate to constitute the lens array 299, or alternatively, the lenses LS may be formed on the both surfaces 2991-*t* and 2991-*h* of the lens array substrate to constitute the lens array 299.

Further, the three lens rows LSR are arranged in the width direction LTD in the embodiments above. However, the number of the lens rows LSR is not limited this but may be one for instance.

Further, although the two lens arrays 299 are used in the above embodiments, the number of the lens arrays 299 is not limited to this.

In the above embodiments, organic EL elements are used as the light emitting elements 2951. However, the devices other than the organic EL elements may be used as the light emitting elements 2951. For example, LEDs (light emitting diodes) may be used as the light emitting elements 2951.

D. EXAMPLES

Next, examples of the invention are described, but the invention is not restricted by the following examples and can be, of course, embodied by being appropriately changed within the scope conformable to the gist described above and below. Any of these examples are embraced by the technical scope of the invention.

Figure 22:
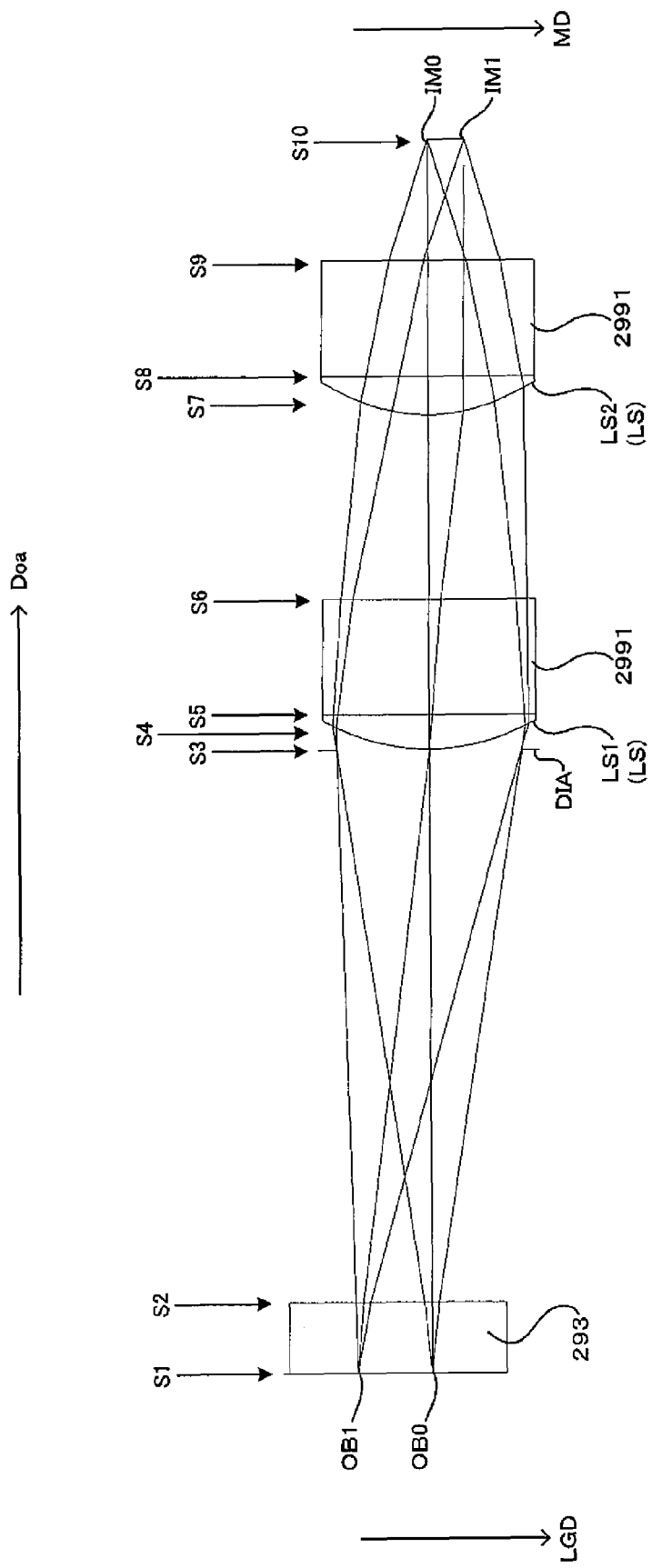
FIG. 22 is a view showing an optical system according to the example and showing a cross section taken along the main scanning direction.

FIG. 22 is a view showing an optical system according to the example and showing a cross section taken along the main scanning direction MD. In this example, a diaphragm DIA is provided in front of the first lens LS1 in the light beam propagation direction Doa so that a light beam restricted by the diaphragm DIA impinges upon the first lens LS1. FIG. 22 shows the optical path of a light beam which leaves an object point OB0, which is on the optical axis OA, and converges at an image point IM0 and the optical path of a light beam which leaves an object point OB1, which is different from the optical axis OA, and converges at an image point IM1. The structure other than the diaphragm DIA is approximately similar to those according to the first embodiment and the like. The optical systems including the lenses LS are arranged such that the three lenses LS-u, LS-m and LS-d are arranged in the direction of the line A-A shown in FIGS. 5, 9 and the like to form the lens rows.

Figure 23:
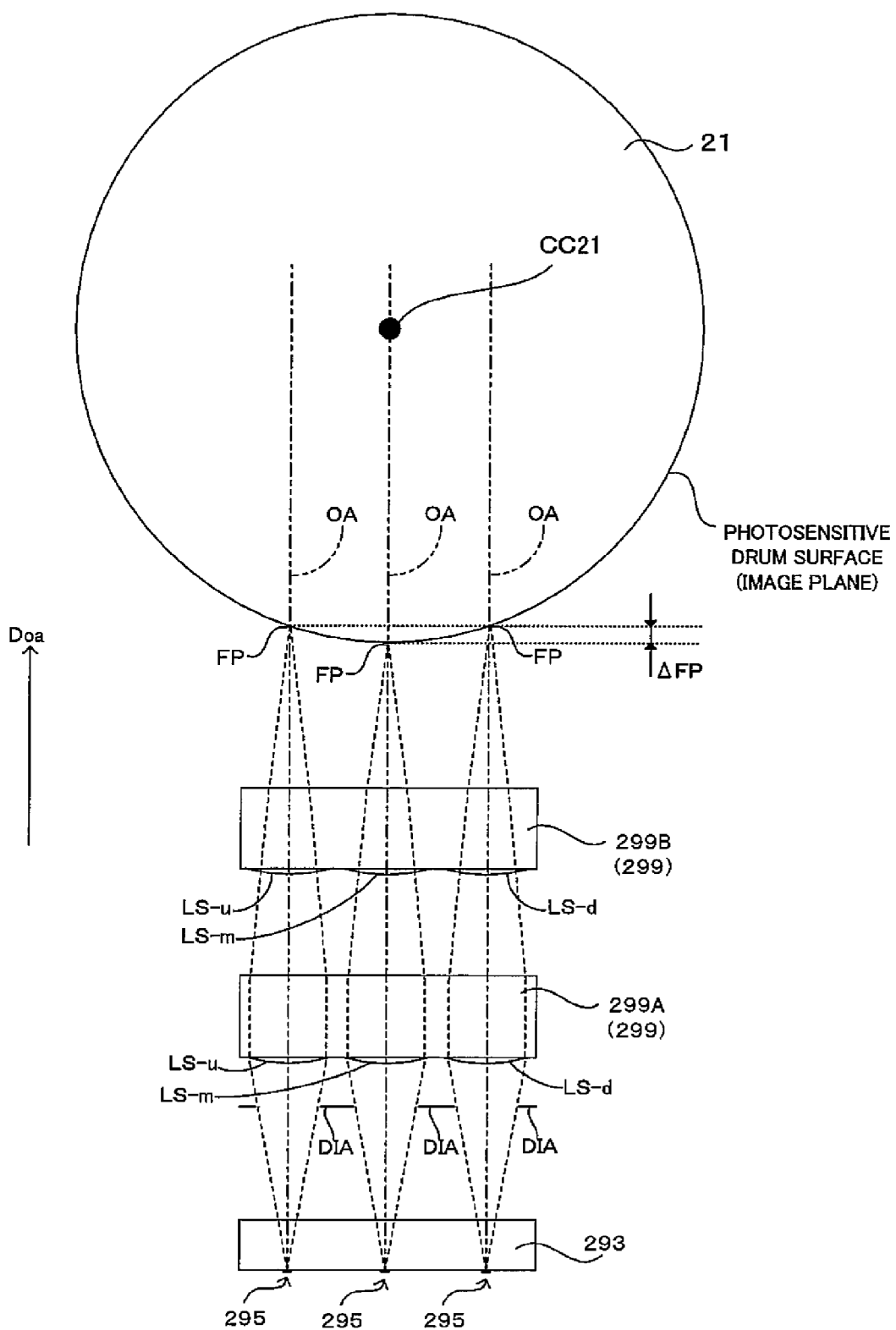
FIG. 23 is a partial cross sectional view of the line head and the photosensitive drum taken along the line A-A according to the example.

FIG. 23 is a partial cross sectional view of the line head and the photosensitive drum taken along the line A-A according to the example. As shown in FIG. 23, the line head formed by the light emitting element groups 295, the diaphragm DIA and the lens arrays 299A and 299B is arranged opposed against the photosensitive drum 21. The photosensitive drum 21 has an approximately cylindrical shape around a rotation axis CC21, and the surface of the photosensitive drum has a finite curvature. The shape of the surface of the photosensitive drum will now be specifically referred to as a "curvature shape".

In this example, the respective optical systems are arranged at equal pitches in a horizontal direction in FIG. 23, and the optical axis OA of the optical system including the middle lenses LS-m passes through the rotation axis CC21 of the photosensitive drum 21. Hence, in order to approximately coincide the image forming positions at which the optical systems focus light beams with the surface of the photosensitive drum, it is necessary to adjust, for each optical system, the image forming position in the light beam propagation direction Doa (that is, the direction of the optical axes OA). In the example shown in FIG. 23, between the optical systems which include the upstream lenses LS-u and the optical systems which include the downstream lenses LS-d, the image forming positions FP in the light beam propagation direction Doa are equal to each other. On the other hand, between the optical systems which include the upstream lenses LS-u (or the downstream lenses LS-d) and the optical systems which include the middle lenses LS-m, the image forming positions in the light beam propagation direction Doa are different from each other by a distance ΔFP. As the data below show, in this example, the optical systems which include the lenses LS-u and LS-d have different structures from the optical systems which include the middle lenses LS-m.

FIG. 24 is a table showing optical data according to this example. As shown in FIG. 24, the wavelength of light beams emitted from the light emitting elements is 690 [mm]. The diameter of the photosensitive member is 40 [mm]. FIG. 25 is a table showing the data of the optical systems which include the middle lenses. As shown in FIG. 25, in the optical systems which include the middle lenses LS-m, the lens surfaces (denoted at the surface number S4) of the first lenses LS1 and the lens surfaces (denoted at the surface number S7) of the second lenses LS2 are both free-form surfaces (X-Y polynomial surfaces). FIG. 26 is a drawing of definitional equations which define the X-Y polynomial surfaces. The shape of the lens surfaces of the first lenses LS1 is expressed by these equations and the coefficients which are shown in FIG. 27. The shape of the lens surfaces of the second lenses LS2 is expressed by these equations and the coefficients which are shown in FIG. 28. FIG. 27 is a table of the coefficients indicative of the surfaces S4 of the optical systems which include the middle lenses, and FIG. 28 is a table of the coefficients indicative of the surfaces S7 of the optical systems which include the middle lenses.

FIG. 29 is a table showing the data of the optical systems which include the upstream lenses and the downstream lenses. As shown in FIG. 29, in the optical systems which include the upstream lenses LS-u and the downstream lenses LS-d as well, the lens surfaces (denoted at the surface number S4) of the first lenses LS1 and the lens surfaces (denoted at the surface number S7) of the second lenses LS2 are both free-form surfaces (X-Y polynomial surfaces). The definitional equations shown in FIG. 26 and the coefficients which are shown in FIG. 30 express the shape of the lens surfaces of the first lenses LS1. The definitional equations shown in FIG. 26 and the coefficients which are shown in FIG. 31 express the shape of the lens surfaces of the second lenses LS2. FIG. 30 is a table of the coefficients which are indicative of the surfaces S4 of the optical systems which include the upstream lenses and the downstream lenses, and FIG. 31 is a table of the coefficients which are indicative of the surfaces S7 of the optical systems which include the upstream lenses and the downstream lenses.

As described above, the lenses LS of the lens array 299 are lenses having free-form surfaces in this example. Lenses having free-form surfaces in this context are lenses whose lens surfaces are free-form surfaces. This improves the imaging characteristics of the lenses, and therefore, makes it possible to realize even more excellent exposure.

In this example, the respective lenses LS are not connected with each other in the width direction LTD. That is, the lenses LS-u, LS-m and LS-d are not connected. However, the lenses LS-u, LS-m and LS-d may be connected in the width direction LTD. This makes it possible to make a large amount of light impinge upon the lenses LS-u, LS-m and LS-d without widening the intervals between the lenses LS-u, LS-m and LS-d in the width direction LTD. In other words, it is possible to reduce the width of the lens array 299 in the width direction LTD. As a result, it is possible to reduce the width of the line head 29 and to create a space around the photosensitive drum 21. Hence, it is possible to mount other functional parts in this space in a concentrated manner and to reduce the size of the image forming apparatus.

An embodiment of an exposure head according to an aspect of the invention comprises: a lens array that includes a light transmissive substrate whose length in a first direction is greater than a length thereof in a second direction orthogonal to the first direction, a first lens that is arranged on the light transmissive substrate, and a second lens that is arranged on the light transmissive substrate at the first direction of the first lens, the first lens and the second lens being connected in the first direction; and a head substrate that is provided with a first light emitting element that emits a light toward the first lens and a second light emitting element that emits a light toward the second lens.

Further, the lens array may include a third lens that is arranged on the light transmissive substrate at the second direction of the first lens and the third lens and the first lens may be connected. In this structure, it is possible to make a large amount of light impinge upon the third and the first lenses without widening the intervals between the third and the first lenses and to realize excellent exposure.

Furthermore, the third lens and the second lens may be connected. In this structure, it is possible to make a large amount of light impinge upon the third lens and the second lens without widening an interval between the third lens and the second lens and to realize excellent exposure.

As described above, in the structure that the first lens or the second lens and the third lens, which is arranged at the second direction of these lenses, are connected, it is possible to ensure a large amount of light into the lenses without widening an interval between the first lens or the second lens and the third lens. In other words, this is a structure which can reduce the width of the lens array in the second direction. In consequence, an area in which the light emitting elements are arranged corresponding to the lenses can be made relatively narrow in the second direction. It is therefore possible to create vacant spaces at the both sides in the second direction of the head substrate on which the light emitting elements are arranged. Consequently, a drive circuit for driving the light emitting elements may be arranged in the vacant spaces. That is, the head substrate may be provided with a drive circuit for driving the first light emitting element and the second light emitting element at the second direction of the first light emitting element and of the second light emitting element. The drive circuit may be formed by a TFT.

Further, it is particularly favorable to apply the invention to a structure in which the light emitting elements are organic EL elements. That is, where organic EL elements are used as the light emitting elements, the light emitting elements emit less light than where LEDs or the like are used as the light emitting elements. This is particularly true when organic EL elements of the bottom emission type are used as the light emitting elements. For such a structure, it is preferable to apply the invention to make a large amount of light impinge upon the lenses.

Further, the light transmissive substrate may be made of glass. That is, the coefficient of linear expansion of glass is relatively small. Therefore, by forming the light transmissive substrate with glass, it is possible to suppress deformation of the lens array caused by a temperature change and to realize excellent exposure independently of the temperature.

Further, the lenses may be made of a light curing resin. A light curing resin hardens when irradiated with light. Therefore, it is possible to manufacture the lens array in a simple manner where the lenses are made of a light curing resin. Hence, it is possible to suppress the cost of the lens array.

Further, the lenses may be lenses having free-form surfaces. This is because use of lenses having free-form surfaces improves the imaging characteristics of the lenses, which makes it possible to realize even more excellent exposure.

An embodiment of an image forming apparatus according to another aspect of the invention comprises: a latent image carrier; and an exposure head that exposes the latent image carrier and includes a lens array and a head substrate, the lens array having a light transmissive substrate whose length in a first direction is greater than a length thereof in a second direction orthogonal to the first direction, a first lens that is arranged on the light transmissive substrate, and a second lens that is arranged on the light transmissive substrate at the first direction of the first lens, the first lens and the second lens being connected in the first direction, the head substrate being provided with a first light emitting element that emits a light to be imaged on the latent image carrier by the first lens and a second light emitting element that emits a light to be imaged on the latent image carrier by the second lens.

Further, in a structure where the latent image carrier is a photosensitive drum, since the photosensitive drum has a cylindrical shape, if the first lens and the third lens have same shapes, imaged positions of some lenses may get deviated from the surface of the photosensitive drum in some instances. As a result, there are some cases that excellent exposure cannot be executed. In light of this, the lens array may include a third lens that is arranged on the light transmissive substrate at the second direction of the first lens, the head substrate may include a third light emitting element that emits a light to be imaged on the latent image carrier by the third lens, and shapes of the first lens and the third lens may be so constructed and arranged that a position at which a light from the first light emitting element is imaged by the first lens and a position at which a light from the third light emitting element is imaged by the third lens are positions in conformity with a shape of the photosensitive drum.

Further, the third lens and the first lens may be connected. In this structure, it is possible to make a large amount of light impinge upon the third lens and the first lens without widening an interval between the third lens and the first lens and to realize excellent exposure.

Furthermore, the third lens and the second lens may be connected. In this structure, it is possible to make a large amount of light impinge upon the third lens and the second lens without widening an interval between the third lens and the second lens and to realize excellent exposure.

As described above, in the structure that the first lens or the second lens and the third lens, which is arranged at the second direction of these lenses, are connected, it is possible to ensure a large amount of light into the lenses without widening an interval between the first lens or the second lens and the third lens. In other words, this is a structure which can reduce the width of the lens array in the second direction. It is therefore possible to reduce the width of the exposure head and accordingly create a vacant space around the latent image carrier. As a result, it is possible to mount other functional parts in this space and to reduce the size of the image forming apparatus.

An embodiment of a lens array according to still another aspect of the invention comprises a lens array substrate that is light transmissive. A lens row that includes lenses arranged in a first direction is arranged on the lens array substrate. The lenses that are adjacent to each other in the first direction are connected with each other in the lens row.

Further, an embodiment of a line head according to another aspect of the invention comprises a head substrate and a lens array. Light emitting element groups each of which includes light emitting elements as a group are arranged on the head substrate. The lens array includes a light transmissive lens array substrate on which lenses are arranged for each light emitting element group. A lens row that includes lenses arranged in a first direction is arranged on the lens array substrate. The lenses that are adjacent to each other in the first direction are connected with each other in the lens row.

Further, an embodiment of an image forming apparatus according to another aspect of the invention comprises a line head and a latent image carrier that is exposed by the line head to form a latent image thereon. The line head includes a head substrate and a lens array. Light emitting element groups each of which includes light emitting elements as a group are arranged on the head substrate. The lens array includes a light transmissive lens array substrate on which lenses are arranged for each light emitting element group. A lens row that includes lenses arranged in a first direction is arranged on the lens array substrate. The lenses that are adjacent to each other in the first direction are connected with each other in the lens row.

In the embodiment (the lens array, the line head, and the image forming apparatus) structured as described above, lenses are arranged on the lens array substrate that is light transmissive. A lens row that includes lenses arranged in a first direction is arranged on the lens array substrate. The lenses adjacent to each other in the first direction are connected with each other in the lens row. In other words, according to the embodiment, there are no gaps between the adjacent lenses in the first direction unlike where the related techniques are used, and the adjacent lenses are connected with each other. It is therefore possible to make a large amount of light impinge upon the lenses even at a high resolution and realize excellent exposure.

Further, in the lens array substrate, lens rows may be arranged in a second direction which is orthogonal to or approximately orthogonal to the first direction and the lenses of the adjacent lens rows in the second direction may be connected with each other. This is because connection of the lenses in the second direction as well permits to make an even larger amount of light impinge upon the lenses even at a high resolution and realize even more excellent exposure.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image forming apparatus, comprising:
a photosensitive drum; and
an exposure head that exposes the photosensitive drum and includes a lens array and a head substrate, the lens array having a light transmissive substrate whose length in a first direction is greater than a length thereof in a second direction orthogonal to the first direction, a first lens that is arranged on the light transmissive substrate, a second lens that is arranged on the light transmissive substrate at the first direction of the first lens, and a third lens that is arranged on the light transmissive substrate at the second direction of the first lens, the first lens and the second lens being connected in the first direction, the first lens and the third lens being not connected, the head substrate being provided with two light emitting elements that emit a light to be imaged on the photosensitive drum by the first lens, two light emitting elements that emit a light to be imaged on the photosensitive drum by the second lens, and two light emitting elements that emit a light to be imaged on the photosensitive drum by the third lens, wherein
a boundary between the first lens and the second lens is at a height $\Delta$ from the light transmissive substrate, and
shapes of the first lens and the third lens are different from each other so that a position at which a light is imaged by the first lens and a position at which a light is imaged by the third lens are positions in conformity with a shape of the photosensitive drum.

2. An image forming apparatus, comprising:
a photosensitive drum; and
an exposure head that exposes the photosensitive drum and includes a lens array and a head substrate, the lens array having a light transmissive substrate whose length in a first direction is greater than a length thereof in a second direction orthogonal to the first direction, a first lens that is arranged on the light transmissive substrate, a second lens that is arranged on the light transmissive substrate at the first direction of the first lens, and a third lens that is arranged on the light transmissive substrate at the second direction of the first lens, the first lens and the second lens being connected in the first direction, the first lens and the third lens being connected, the head substrate being provided with two light emitting elements that emit a light to be imaged on the photosensitive drum by the first lens, two light emitting elements that emit a light to be imaged on the photosensitive drum by the second lens, and two light emitting elements that emit a light to be imaged on the photosensitive drum by the third lens, wherein
a boundary between the first lens and the second lens is at a height $\Delta$ from the light transmissive substrate, and
shapes of the first lens and the third lens are different from each other so that a position at which a light is imaged by the first lens and a position at which a light is imaged by the third lens are positions in conformity with a shape of the photosensitive drum.

* * * * *